United States Patent
Sasaki

(10) Patent No.: US 9,778,544 B2
(45) Date of Patent: Oct. 3, 2017

(54) LENS BARREL

(71) Applicant: HOYA CORPORATION, Tokyo (JP)

(72) Inventor: Takamitsu Sasaki, Saitama (JP)

(73) Assignee: HOYA CORPORATION, Tokyo (JP)

( * ) Notice: Subject to any disclaimer, the term of this patent is extended or adjusted under 35 U.S.C. 154(b) by 145 days.

(21) Appl. No.: 14/596,705

(22) Filed: Jan. 14, 2015

(65) Prior Publication Data

US 2015/0205068 A1 Jul. 23, 2015

(30) Foreign Application Priority Data

Jan. 22, 2014 (JP) ................................. 2014-009524

(51) Int. Cl.
| | | |
|---|---|---|
| *G02B 15/14* | (2006.01) | |
| *G03B 3/10* | (2006.01) | |
| *G02B 7/10* | (2006.01) | |
| *G03B 5/00* | (2006.01) | |

(52) U.S. Cl.
CPC ............... *G03B 3/10* (2013.01); *G02B 7/102* (2013.01); *G03B 5/00* (2013.01); *G03B 2205/0092* (2013.01)

(58) Field of Classification Search
CPC .... G03B 3/10; G03B 5/00; G03B 2205/0092; G02B 7/102
See application file for complete search history.

(56) References Cited

U.S. PATENT DOCUMENTS

| | | |
|---|---|---|
| 6,978,089 B2 | 12/2005 | Nomura et al. |
| 7,025,512 B2 | 4/2006 | Nomura |
| 2009/0123145 A1* | 5/2009 | Nomura ................. G02B 7/102 396/529 |
| 2013/0188262 A1 | 7/2013 | Sasaki |

FOREIGN PATENT DOCUMENTS

| | | |
|---|---|---|
| JP | 2007-248642 A | 9/2007 |
| JP | 2010-191442 A | 9/2010 |

* cited by examiner

*Primary Examiner* — Alicia M Harrington
(74) *Attorney, Agent, or Firm* — Greenblum & Bernstein, P.L.C.

(57) ABSTRACT

A lens barrel includes a first drive mechanism which rotates a cam ring to move a cam-driven lens frame, holding a lens group, in accordance with a cam groove; a second drive mechanism which screw-engages a nut with a feed screw, biases a nut-driven lens frame to abut the nut, and moves the nut-driven lens frame. The cam-driven lens frame is positioned adjacent to the nut-driven lens frame on a reverse side to the biasing direction, and driving ranges of these lens frames partially overlap each other. The first drive mechanism includes a cam-driven member, separate from the cam-driven lens frame, which is linearly guided and provided with a cam follower which engages with the cam groove of the cam ring; and a biasing member which biases the cam-driven lens frame to abut against the cam-drive member, so that the cam-driven lens frame moves with the cam-driven member.

11 Claims, 16 Drawing Sheets

LENS BARREL

BACKGROUND OF THE INVENTION

1. Field of the Invention

The present invention relates to a lens barrel of an imaging apparatus, and in particular, relates to a drive mechanism for moving (driving) a lens group that constitutes a photographing optical system in an optical axis direction thereof.

2. Description of the Related Art

In a lens barrel provided with at least one lens group, of a photographing optical system, which is moved in an optical axis direction thereof to carry out a zooming operation and/or a focusing operation, there have been numerous countermeasures taken in order to prevent damage and/or breakage of the lens group and the drive mechanism therefor even in the case where a mechanical or control error of some kind occurs during the driving (moving) of the lens group.

One known example of such a countermeasure, in a lens barrel provided with a first drive system which controls the position of a lens support frame via a cam mechanism, provided with a cam ring which is rotatably driven by a motor, and a second drive system which controls the position of another lens support frame by a feed screw and a nut which are rotatably driven via another motor, is an arrangement which prevents overloading caused by interference between the lens groups (and/or the lens support frames thereof) that are driven by the first and second drive systems.

The first drive system is often used for driving (moving) a lens group to carry out a zooming operation in a zoom lens system barrel provided with a cam follower on a lens support frame (or a member that supports a lens support frame) which is engaged with a cam groove (including a lead groove, etc., in addition to a curved-profile cam groove) formed in a peripheral surface of the cam ring, and the lens support frame is moved (advanced and retracted) in the optical axis direction in accordance with the contours of the cam groove upon rotatably driving the cam ring.

The second drive system is often used for driving (moving) a focusing lens group and includes a feed screw which is formed on a rotational axis of a motor and extends in the optical axis direction, and the lens support frame (of the focusing lens group) which is movably guided in the optical axis direction is biased to be brought into contact with a nut that is screw-engaged with the feed screw. By forwardly/rearwardly moving the nut along the thread of the feed screw, the nut presses and moves the lens support frame in a direction against the biasing force, and the lens support frame follows the nut by the biasing force in the other direction.

If countermeasures are taken so that the operational (movement) range of the lens group of the first drive system and the operational (movement) range of the lens group of the second drive system do not mutually overlap each other, the lens groups (and the lens support frames thereof) that are respectively driven by the first and second drive systems do not mutually interfere with each other even if an unexpected out-of-control movement, etc., of the nut occurs in the second drive system. However, in such an arrangement, a problem exists with the size (the length in the optical axis direction in particular) of the lens barrel increasing in order to obtain a large amount of movement space for each lens group; hence, such arrangement is especially unsuitable for a lens barrel which retracts (shortens its length) in order to be accommodated in a camera body when in a fully-retracted state. Furthermore, there are many instances where, from the viewpoint of optical design, the lens group movement ranges of the first and second drive systems cannot be completely excluded from each other (i.e., cannot be made different so as not to overlap each other) with respect to the optical axis direction.

Accordingly, in a lens barrel in which the movement ranges of the lens groups partially overlap each other between the first and second drive systems, the lens barrel was configured while paying attention to the fact that in the second drive system the movement of the lens support frame is not mechanically restricted in a direction away from the nut (a direction against the biasing force), so that the lens support frame can escape in a direction away from the nut in the case where an operational malfunction, etc., occurs. In other words, the lens support frame (designated as a first lens support frame) that is driven (moved) by the first drive system is provided at a position on the biasing-direction side of the lens support frame (designated as a second lens support frame) that is driven (moved) by the second drive system, in the case where the first and second lens support frames come on contact with each other, the second lens support frame is pushed by the first lens support frame in a direction against the biasing force. Since the movement of the second lens support frame in this direction (against the biasing force) is not restricted by the nut, an excessive load can be avoided from being exerted on the first drive system and the second drive system. Specifically, an arrangement is known in the art in which the second lens support frame is provided at the rearmost position (closest to the image side) in the optical axis direction and is biased forwardly (toward the object side) in the optical axis direction so that the second lens support frame is brought into contact with the nut, and the first lens support frame is provided in front (on the object side) of the second lens support frame. In this arrangement, during a lens barrel accommodation operation (lens barrel retracting operation), in the case where the second lens support frame does not correctly move rearwardly in the optical axis direction via the nut when it should, the first lens support frame, which is carrying out a lens barrel accommodation operation while rearwardly moving in the optical axis direction, pushes the second lens support frame so that the first and second lens support frames both move rearwardly in the optical axis direction. Furthermore, in the case where the second lens support frame moves forwardly in an out-of-control manner in the optical axis direction so that the nut exceeds the restricted movement amount thereof, the movement of the second lens support frame is restricted by the second lens support frame coming into contact with the first lens support frame, so that only the nut is allowed to move forward thereafter without inflicting excessive load on the first and second lens support frames.

Examples of the related art are disclosed in Japanese Unexamined Patent Publication Nos. 2007-248642 and 2010-191442.

In the above-described arrangement in which the first lens support frame that is driven by the cam mechanism is provided at a position on the biasing-direction side of the second lens support frame that is driven by the feed screw and the nut (so that the lens support frame and the nut move away from each other in the optical axis direction in the case where an operational malfunction, etc., occurs), such an arrangement is effective in the case where no other interfering member exists on the reverse side of the position on the biasing-direction side of the second lens support frame. However, there is a demand to achieve a higher zoom ratio and an improved optical quality of the zoom lens system without having such restrictions, in which it is desired for the first lens support frame that is driven by the cam mechanism to also be provided on the reverse side, with respect to the biasing-direction side, of the second lens support frame that is driven by the feed screw and the nut.

SUMMARY OF THE INVENTION

In order to address the above-described demands, the present invention provides a lens barrel including a first drive system (first drive mechanism) that uses a cam mechanism and a second drive system (second drive mechanism) that uses a feed screw and a nut, in which the freedom in the arrangement (positions) of first and second lens groups, which are driven by the first and second drive systems, respectively, are increased; and the first and second drive systems are protected from an excessive load being exhibited thereon in the case where an operational malfunction, etc., occurs.

According to an embodiment, a lens barrel is provided, including a first drive mechanism which rotates a cam ring that is supported in a stationary barrel to change a position, with respect to the optical axis direction, of a cam-driven lens frame, which holds a lens group that constitutes part of a photographing optical system, in accordance with a contour of a cam groove formed in a peripheral surface of the cam ring; and a second drive mechanism which screw-engages a nut with a feed screw extending in the optical axis direction, biases a nut-driven lens frame, which holds another lens group that is different to the lens group, in a biasing-direction to abut the nut with respect to the optical axis direction, and which changes a position of the nut-driven lens frame with respect to the optical axis direction by moving the nut in the optical axis direction by rotating the feed screw. The nut-driven lens frame and the cam-driven lens frame are arranged so that the cam-driven lens frame is positioned adjacent to the nut-driven lens frame on a reverse side of the nut-driven lens frame relative to the biasing direction, and wherein driving ranges of the nut-driven lens frame and the cam-driven lens frame partially overlap each other in the optical axis direction. The first drive mechanism includes a cam-driven member, which is formed as a separate member from the cam-driven lens frame, is linearly guided in the optical axis direction and is provided with a cam follower which engages with the cam groove of the cam ring; and a biasing member which biases, in the optical axis direction, the cam-driven lens frame in a direction toward and to closely approach the nut-driven lens frame to thereby cause the cam-driven lens frame to abut against the cam-drive member, so that the cam-driven lens frame is moved in the optical axis direction with the cam-driven member.

According to this configuration, in the case where a driving operation is carried out with the cam-driven lens frame and the nut-driven lens frame interfering with each other, since the load can be absorbed by the first driving mechanism by releasing the contacting state between the cam-driven lens frame and the cam-driven member, it is possible to provide the cam-driven lens frame at a position on the reverse side, with respect to the biasing-direction side, of the nut-driven lens frame so that the operational (movement) ranges of the cam-driven lens frame and the nut-driven lens frame mutually overlap, with respect to the optical axis direction.

It is desirable for the cam groove to be formed on an inner peripheral surface of the cam ring, and for an inner ring, which is restricted from rotating relative to the stationary barrel, to be supported inside the cam ring. The cam-driven member is slidably fitted in a bottomed linear guide groove formed on an outer peripheral surface of the inner ring, so that the cam follower of the cam-driven member projects radially outward relative to the outer peripheral surface of the inner ring. Hence, the first driving mechanism can be configured in a simple and space efficient manner. More specifically, the cam-driven member can include a long and thin plate-shaped guide key part which is elongated in the optical axis direction and slidably fitted into the linear guide groove of the inner ring; and an upright part formed at an end, with respect to the optical axis direction, of the guide key part and extending in a direction that is orthogonal to the optical axis. The cam-driven lens frame abuts against the upright part by a biasing force of the biasing member.

It is desirable for the lens barrel to include an auxiliary guide rod which is located on an outer side of the cam ring and is fixed to the stationary barrel, the central longitudinal axis of the auxiliary guide rod extending in the optical axis direction, and for the upright part of the cam-driven member to be provided with a guided part, which is slidably supported in the optical axis direction by the auxiliary guide rod. Accordingly, the cam-driven member can be prevented from flexing and a high-precision driving operation can be achieved.

It is desirable for the cam-driven lens frame to include at least one arm which extends in an outer radial direction, centered from the optical axis, from a lens holding portion, which holds the lens group; and for a guided portion to be formed on an outer end of the arm, the guided portion being slidably supported in the optical axis direction on a lens-frame guide rod, the central longitudinal axis thereof extending in the optical axis direction, which is fixed to the stationary barrel. The arm abuts against the upright part of the cam-driven member by a biasing force of the biasing member. In the case where such a cam-driven lens frame is used, it is desirable for the biasing member to include a tension spring, one and the other end of which is engaged onto the stationary barrel and the cam-driven lens frame, respectively, wherein the tension spring extends and contracts in the optical axis direction.

Although the present invention can be applied regardless of the forward/rearward positional relationship of the cam-driven lens frame and the nut-driven lens frame, with respect to the optical axis direction, the lens group that is held by the cam-driven lens frame can be provided on the image side, with respect to the optical axis direction, of a lens group which is held by the nut-driven lens frame. Furthermore, it is desirable for the lens group that is held by the cam-driven lens frame to be provided closest to the image side of the photographing optical system, and for the lens group that is held by the nut-driven lens frame to be provided adjacent to, and on the object side of, the lens group that is provided closest to the image side.

It is desirable for the second drive mechanism to rotate the feed screw by a stepping motor which is mounted onto the stationary barrel.

It is desirable for the photographing optical system to include a zoom optical system, the cam-driven lens frame and the nut-driven lens frame being respectively moved in the optical axis direction during a zooming operation, and for the nut-driven lens frame to be solely moved in the optical axis direction during a focusing operation on an object.

The lens barrel is further provided with a second cam-driven lens frame which holds another lens group that constitutes part of the photographing optical system, and is controlled to move in the optical axis direction by another cam groove that is different from the cam groove that is used to drive the cam-driven lens frame. In a ready-to-photograph state, the cam-driven lens frame and the second cam-driven lens frame are respectively positioned at either side of the nut-driven lens frame with respect to the optical axis direction. In the case where interference occurs between the nut-driven lens frame and the second cam-driven lens frame, the load can be absorbed by the nut and the nut-driven lens frame moving away from each other in the optical axis direction.

It is desirable for the lens barrel to include a second cam ring which is a separate member from the cam ring and rotates with the cam ring, wherein the another cam groove which drives the second cam-driven lens frame is formed in the second cam ring.

According to the lens barrel of the present invention, in a lens barrel provided with a first drive mechanism which drives a cam-driven lens frame in accordance with a cam groove and a second drive mechanism which drives a nut-driven lens frame by an advancing/retracting movement of a nut along a feed screw, an arrangement (positions) of the cam-driven lens frame and the nut-driven lens frame that was difficult to achieve in the related art has been achieved, thereby increasing the degree of freedom in the configuration thereof while protecting the first and second drive mechanisms from an excessive load being exhibited thereon in the case where an operational malfunction, etc., occurs.

The present disclosure relates to subject matter contained in Japanese Patent Application No. 2014-9524 (filed on Jan. 22, 2014) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENTS

Figure 1:
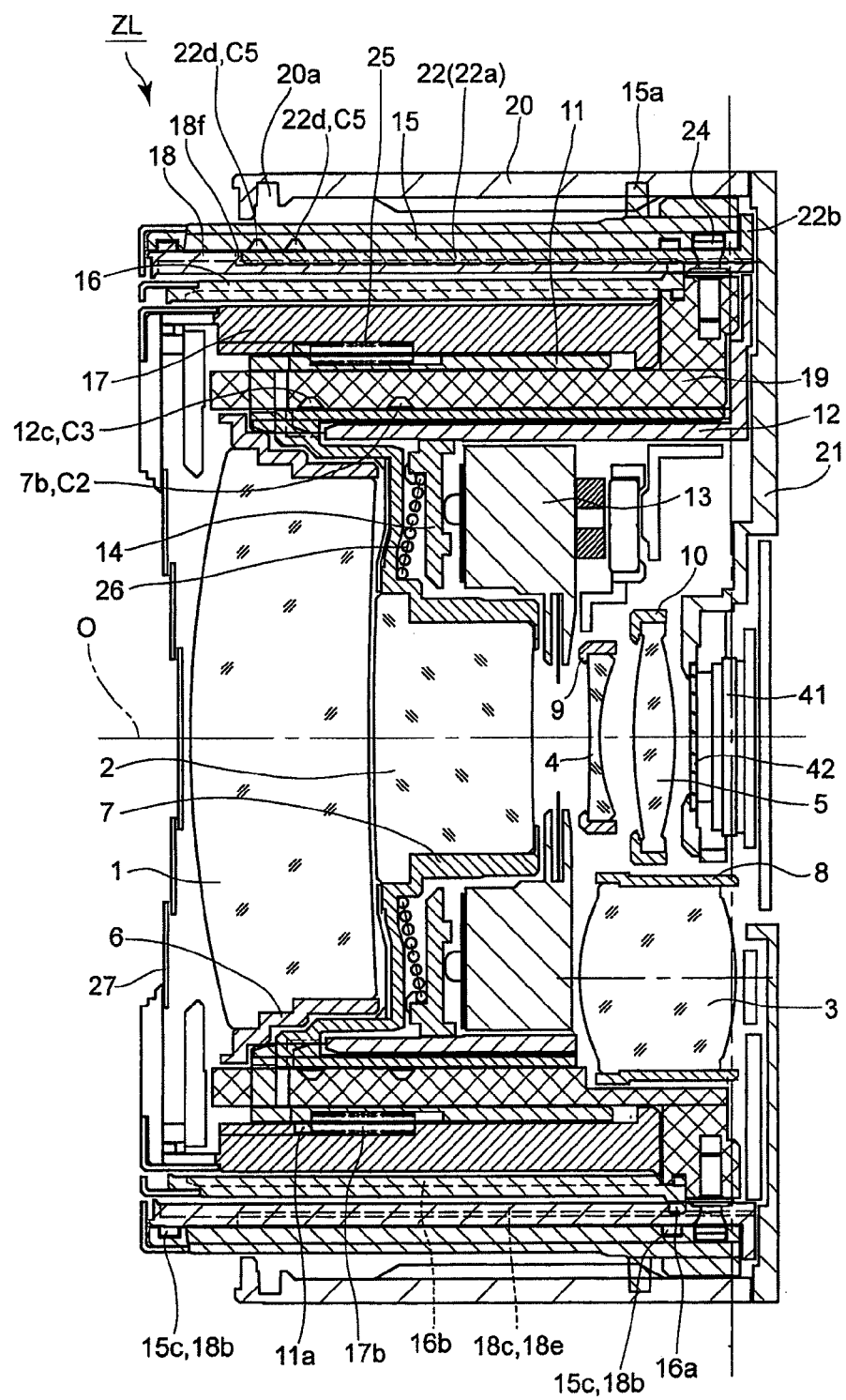
FIG. 1 is a cross-sectional view of a zoom lens barrel, to which the present invention is applied, showing a fully-retracted (accommodated) state.
Figure 2:
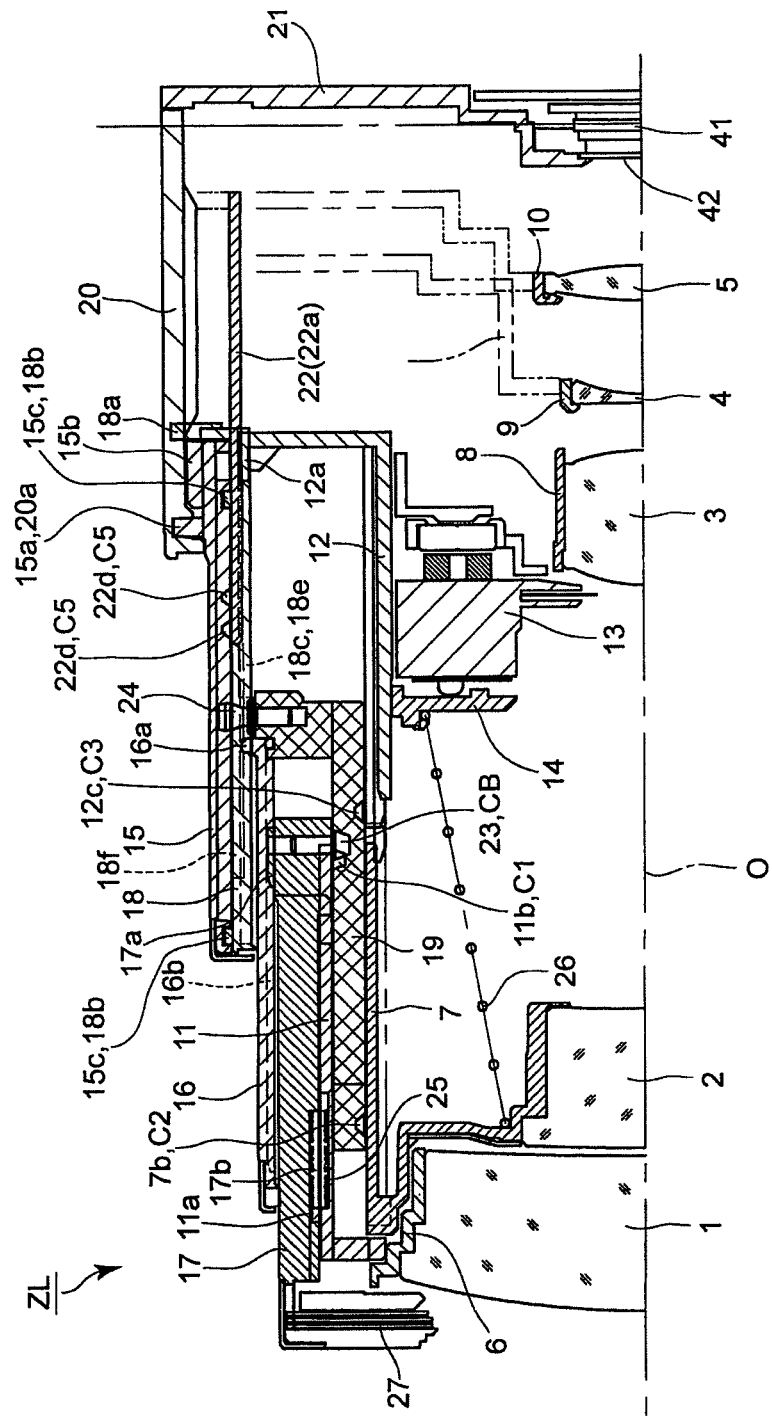
FIG. 2 is a cross-sectional view of the zoom lens barrel of FIG. 1 showing a photographing state at a wide-angle extremity of the zooming range thereof.
Figure 3:
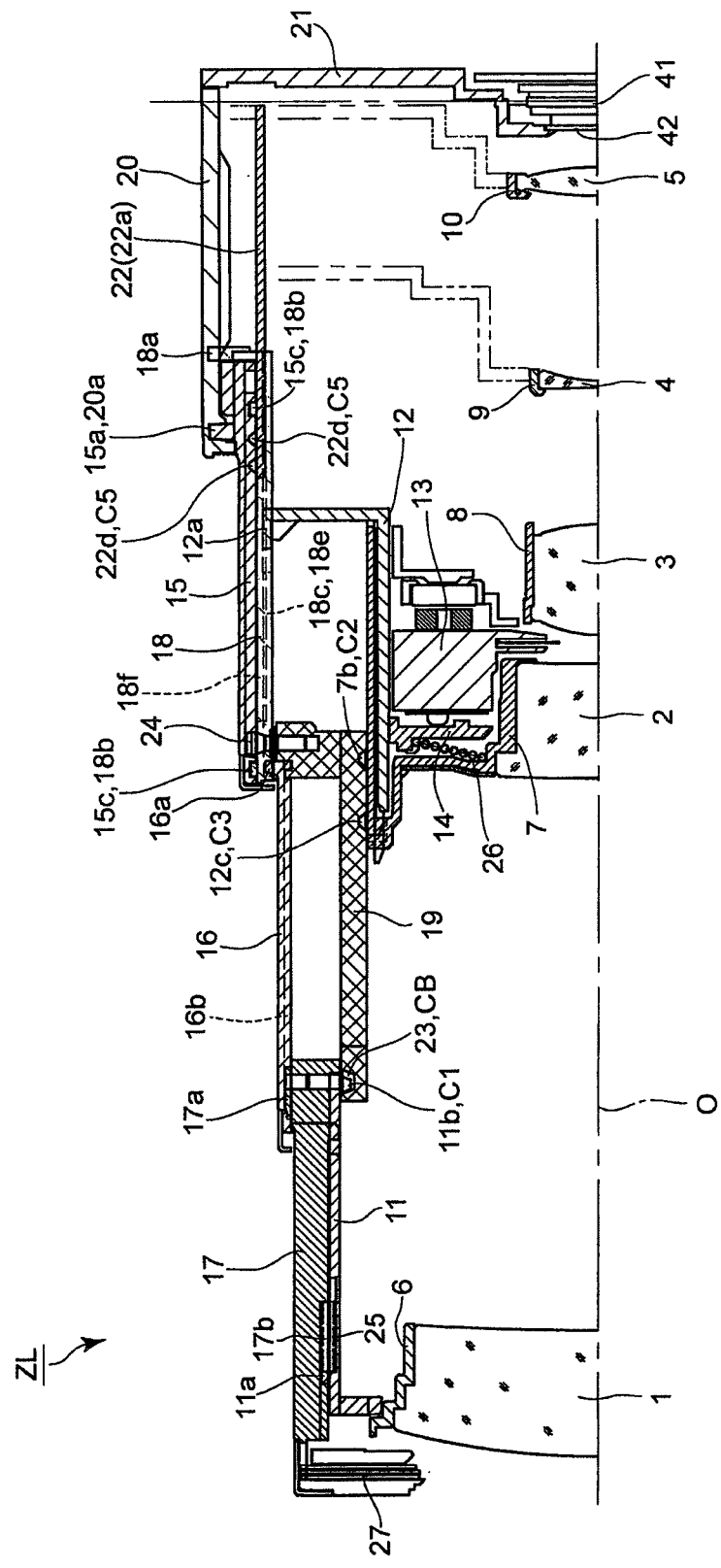
FIG. 3 is a cross-sectional view of the zoom lens barrel of FIG. 1 showing a photographing state at a telephoto extremity of the zooming range thereof.

An embodiment of the present invention will be discussed below with reference to the drawings. A zoom lens barrel ZL of the embodiment shown in FIGS. 1 through 3 showing the overall configuration thereof is mounted onto a camera body (not shown). The photographing optical system of the zoom lens barrel ZL is configured of a first lens group 1, a second lens group 2, a third lens group 3, a fourth lens group 4, a fifth lens group 5, an optical filter 42, and an image sensor 41, in that order from the object side. Each lens group is shown in the drawings as a single lens element even in the case of a lens group being configured of a plurality of lens elements. In the following descriptions, a direction toward the object side along an optical axis O of the photographing optical system designates a forward optical axis direction, and a direction toward the image side along the optical axis O designates a rearward optical axis direction.

The zoom lens barrel ZL can be driven (moved) between the accommodated (fully-retracted) state shown in FIG. 1 and the photographing state shown in FIGS. 2 and 3. In the photographing state, each of the first through fifth lens groups 1 through 5 is moved along the optical axis O in accordance with a predetermined movement path, and a zooming operation can be carried out whereby the focal length is changed between the wide-angle extremity shown in FIG. 2 and the telephoto extremity shown in FIG. 3. The movement paths Q1, Q2, Q3, Q4 and Q5 of the first through fifth lens groups 1 through 5, respectively, from the accommodated state to the zooming range are shown in FIG. 8. Furthermore, in regard to the first lens group 1, the second lens group 2 and the third lens group 3, only the movement paths thereof within the zooming range are shown in FIG. 8; the movement paths from between the wide-angle extremity of the zooming range and the accommodated state are omitted from FIG. 8. The first lens group 1, the second lens group 2, the third lens group 3 and the fifth lens group 5 are driven by a zoom motor 39 (see FIG. 7) to move in the optical axis direction. The fourth lens group 4 constitutes part of the zoom optical system, together with the other lens groups, while also serving as a focusing lens group which is moved in the optical axis direction during a focusing operation to bring the object image in-focus; the fourth lens group 4 is driven by an AF motor 31 (see FIG. 7) independently from the other lens groups in the optical axis direction. FIG. 8 shows a driving range M of the fourth lens group 4 in the optical axis direction via the AF motor 31. The detailed structure of the zoom lens barrel ZL, which supports and drives each lens group, will be discussed hereinbelow.

Figure 7:
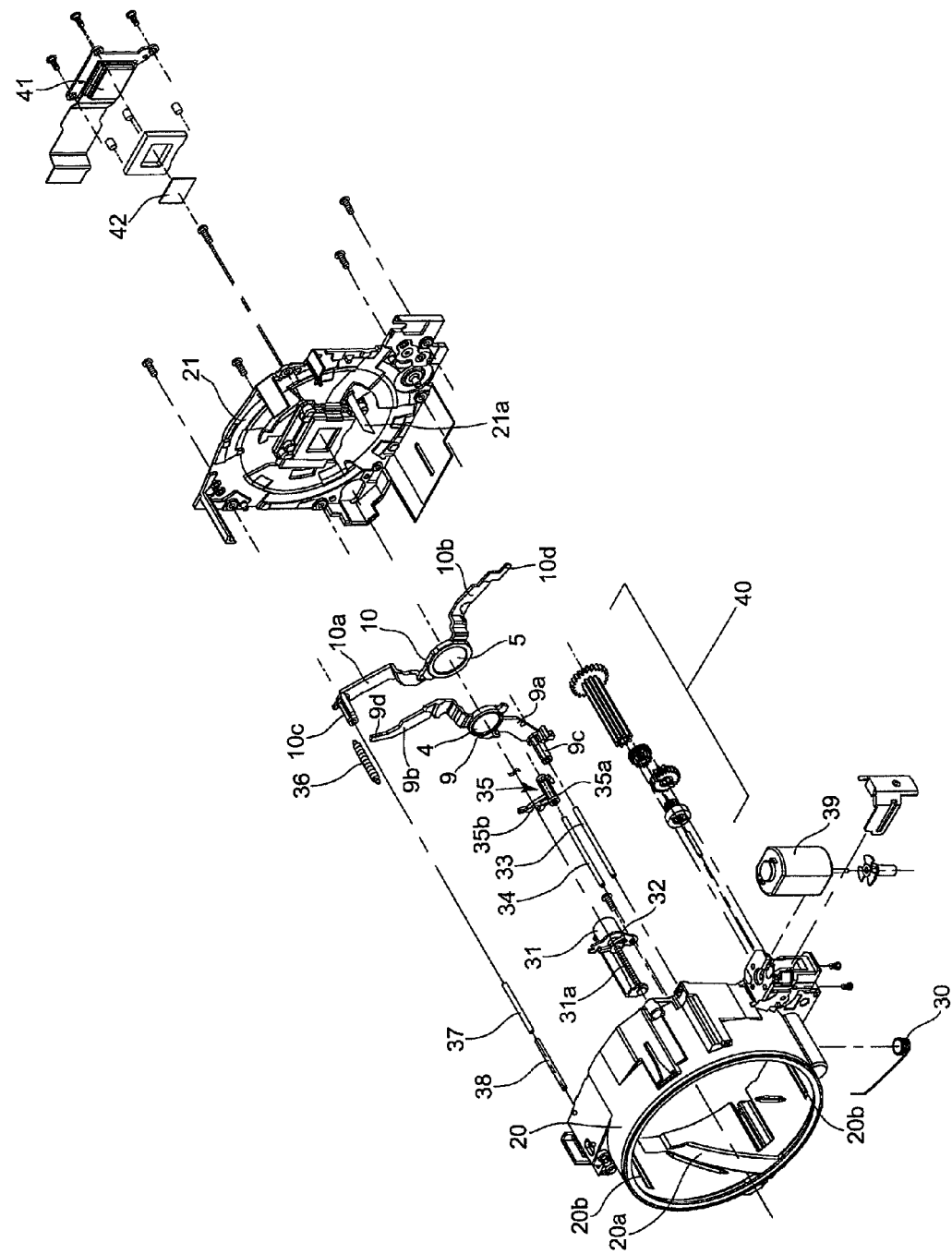
FIG. 7 is an exploded perspective view, viewed obliquely from the front, of some other components of the zoom lens barrel of FIG. 1.
Figure 8:
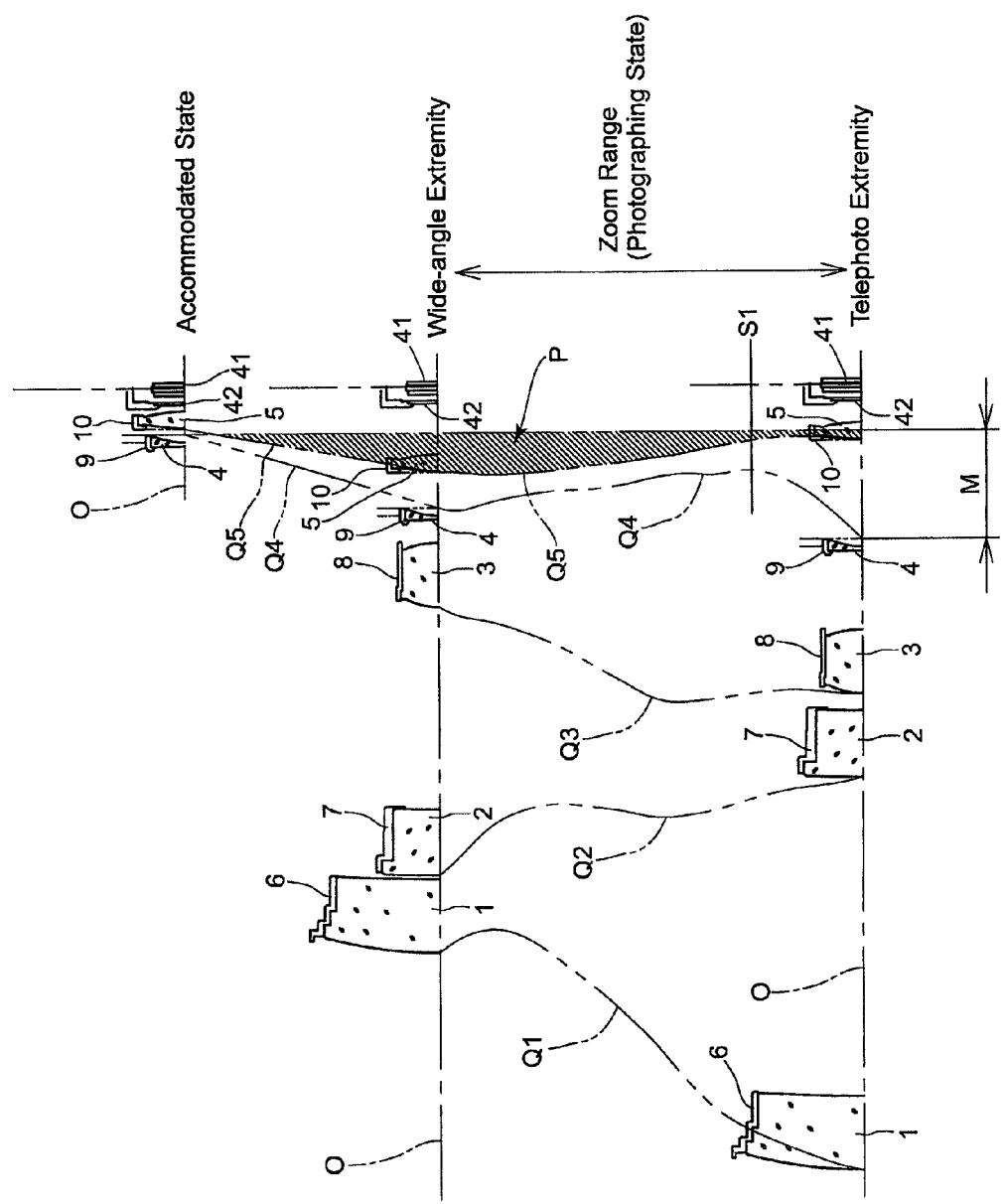
FIG. 8 is a schematic view showing the movement paths of each lens group of the zoom lens barrel of FIG. 1.

As shown in FIG. 7, the zoom lens barrel ZL is provided with a stationary barrel 20 and a lens-barrel rear plate 21, which serve as stationary (fixed) members. The image sensor 41 and the optical filter 42 are configured as a single unit and this single unit is fixed to the lens-barrel rear plate 21. By mounting the lens-barrel rear plate 21 onto the rear end of the stationary barrel 20, the center of the image sensor 41 is positioned on an extension of the optical axis O. An infra-red cut filter or a low-pass filter can be used as an optical filter 42.

As shown in FIGS. 1 through 3, a first advancing/retracting ring (cam ring) 15, a linear guide ring (inner ring) 18, a second advancing/retracting ring 16, a third advancing/retracting ring 17, a first-lens-group support ring 11, an inner cam ring (second cam ring) 19 and a third-lens-group support ring 12 are concentrically provided about the optical axis O inside the stationary barrel 20, in that order from the outer side in the radial direction. The first lens group 1 is supported by a first-lens-group (second cam-driven lens frame) frame 6, the second lens group 2 is supported by a second-lens-group frame (second cam-driven lens frame) 7, the third lens group 3 is supported by a third-lens-group frame (second cam-driven lens frame) 8, the fourth lens group 4 is supported by a fourth-lens-group frame 9, and the fifth lens group 5 is supported by a fifth-lens-group frame 10.

The zoom lens barrel ZL, with respect to the outward appearance thereof, constitutes a three-stage lens barrel provided with three-stage telescoping cylinders (advancing/retracting cylinders) which advance from and retract into the stationary barrel 20; the first advancing/retracting ring 15 and the linear guide ring 18 constitute a first-stage telescoping barrel. A plurality of first-stage guide grooves 20a (only one of which is shown in FIG. 7) are formed on the inner peripheral surface of the stationary barrel 20 at different circumferential positions. A plurality of guide projections 15a (see FIG. 6) are provided, at different circumferential positions, on the outer peripheral surface of the first advancing/retracting ring 15 and project therefrom in the vicinity of the rear end thereof and are slidably fitted into the first-stage guide grooves 20a (see FIG. 7), respectively. The first-stage guide grooves 20a each includes a lead groove portion which is inclined with respect to the optical axis O, and a circumferential groove portion which extends in a circumferential direction about the optical axis O and is communicably connected with the front ends of the first-stage guide grooves 20a. A peripheral surface gear 15b is also formed on the outer periphery of the first advancing/retracting ring 15 at the rear end thereof (at a location behind the guide projections 15a). A driving force of the zoom motor 39 is transmitted to the peripheral surface gear 15b via a zoom gear train 40 so that the guide projections 15a are guided by the first-stage guide grooves 20a to thereby drive the first advancing/retracting ring 15. When the guide projections 15a are respectively positioned in the lead groove portions of the first-stage guide grooves 20a, the first advancing/retracting ring 15 moves in the optical axis direction (advances/retracts) while rotating, and when the guide projections 15a are positioned in the circumferential groove portion of the first-stage guide grooves 20a, the first advancing/retracting ring 15 rotates at a fixed (stationary) position about the optical axis O (without moving in the optical axis direction).

Figure 6:
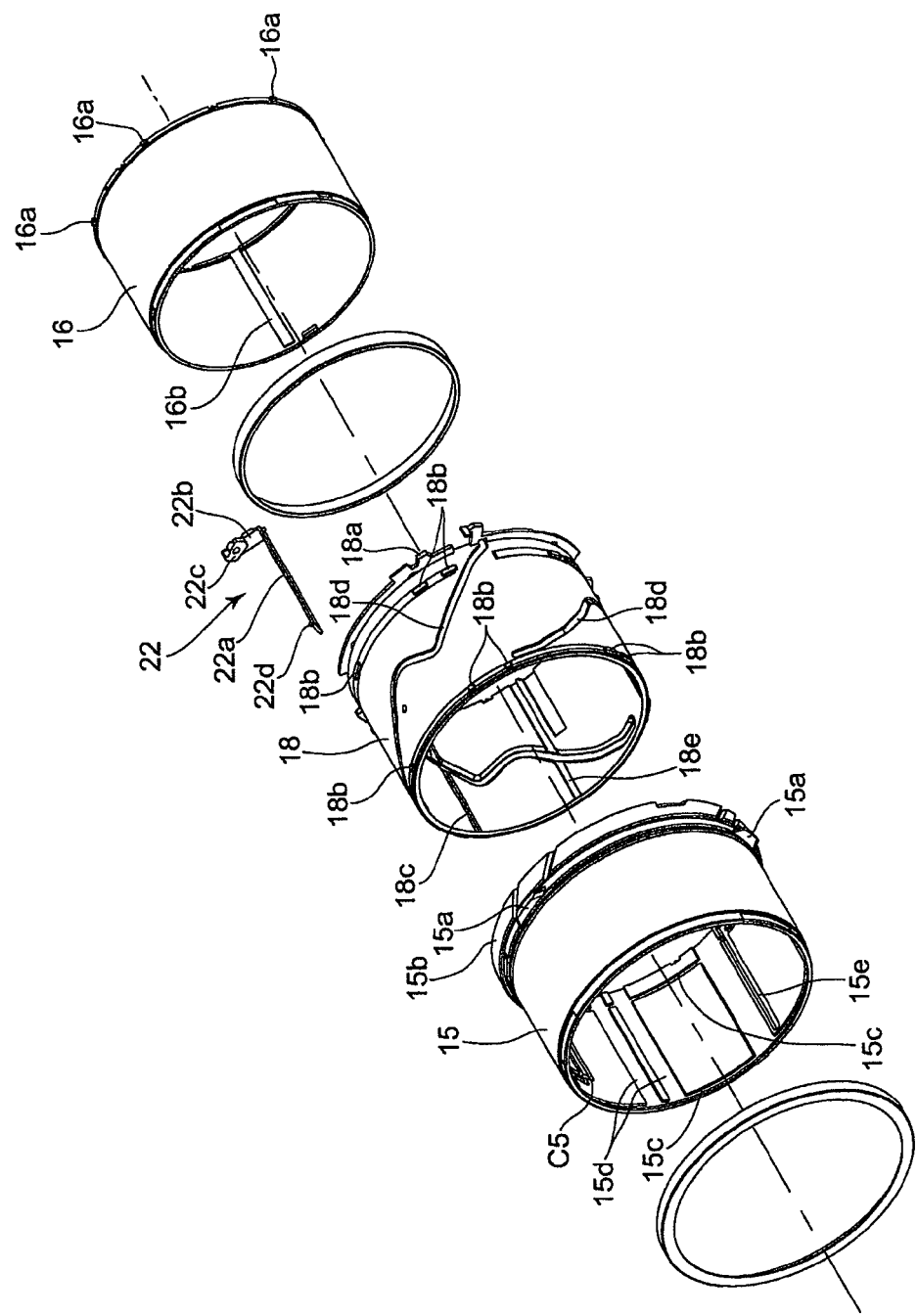
FIG. 6 is an exploded perspective view, viewed obliquely from the front, of some other components of the zoom lens barrel of FIG. 1.

The linear guide ring 18 is provided with a plurality of guide projections 18a (only one of which is shown in FIG. 6) which project, at different circumferential positions, from the outer peripheral surface of the linear guide ring 18 at the rear end thereof. The linear guide ring 18 is linearly guided to move in the optical axis direction by the guide projections 18a being slidably fitted in a plurality of linear guide grooves 20b (see FIG. 7), respectively, which are longitudinal grooves formed in the inner periphery of the stationary barrel 20 and extend in the optical axis direction. The linear guide ring 18 is coupled with the first advancing/retracting ring 15 to allow rotation of the first advancing/retracting ring 15 relative to the linear guide ring 18 while moving with the first advancing/retracting ring 15 in the optical axis direction. More specifically, a plurality of engagement projections 18b (see FIGS. 6, 14 and 15) which are formed on the outer peripheral surface of the linear guide ring 18 are slidably fitted into a pair of front and rear circumferential grooves 15c (see FIGS. 6 and 13) which are formed in the inner peripheral surface of the first advancing/retracting ring 15 at two different positions with respect to the forward/rearward direction (optical axis direction), so that the first advancing/retracting ring 15 and the linear guide ring 18 are integrated with respect to the optical axis direction while being allowed to relatively rotate via the engagement between the circumferential grooves 15c and the engagement projections 18b. Furthermore, a plurality of communicably connecting grooves 15d (see FIGS. 6 and 13), which communicably connect the front and rear pair of circumferential grooves 15c, are formed in the inner peripheral surface of the first advancing/retracting ring 15. The communicably connecting grooves 15d are longitudinal grooves which extend in the optical axis direction which are used as guide grooves for inserting the engagement projections 18b into the front circumferential grooves 15c during assembly.

The second advancing/retracting ring 16 and the inner cam ring 19 constitute a second-stage telescoping barrel. In a similar manner to the engagement relationship between the first advancing/retracting ring 15 and the linear guide ring 18, the second advancing/retracting ring 16 and the inner cam ring 19 are integrated so as to integrally move in the optical axis direction and are engaged with each other in a relatively rotatable manner. As shown in FIG. 6, a plurality of guide projections 16a are provided at the rear end on the outer peripheral surface of the second advancing/retracting ring 16 and project outwardly therefrom, and a plurality of linear guide grooves 18c are longitudinal grooves which are formed in the inner peripheral surface of the linear guide ring 18 and are elongated in the optical axis direction. The second advancing/retracting ring 16 is linearly guided (moved) in the optical axis direction by the guide projections 16a being slidably fitted into the linear guide grooves 18c.

Figure 13:
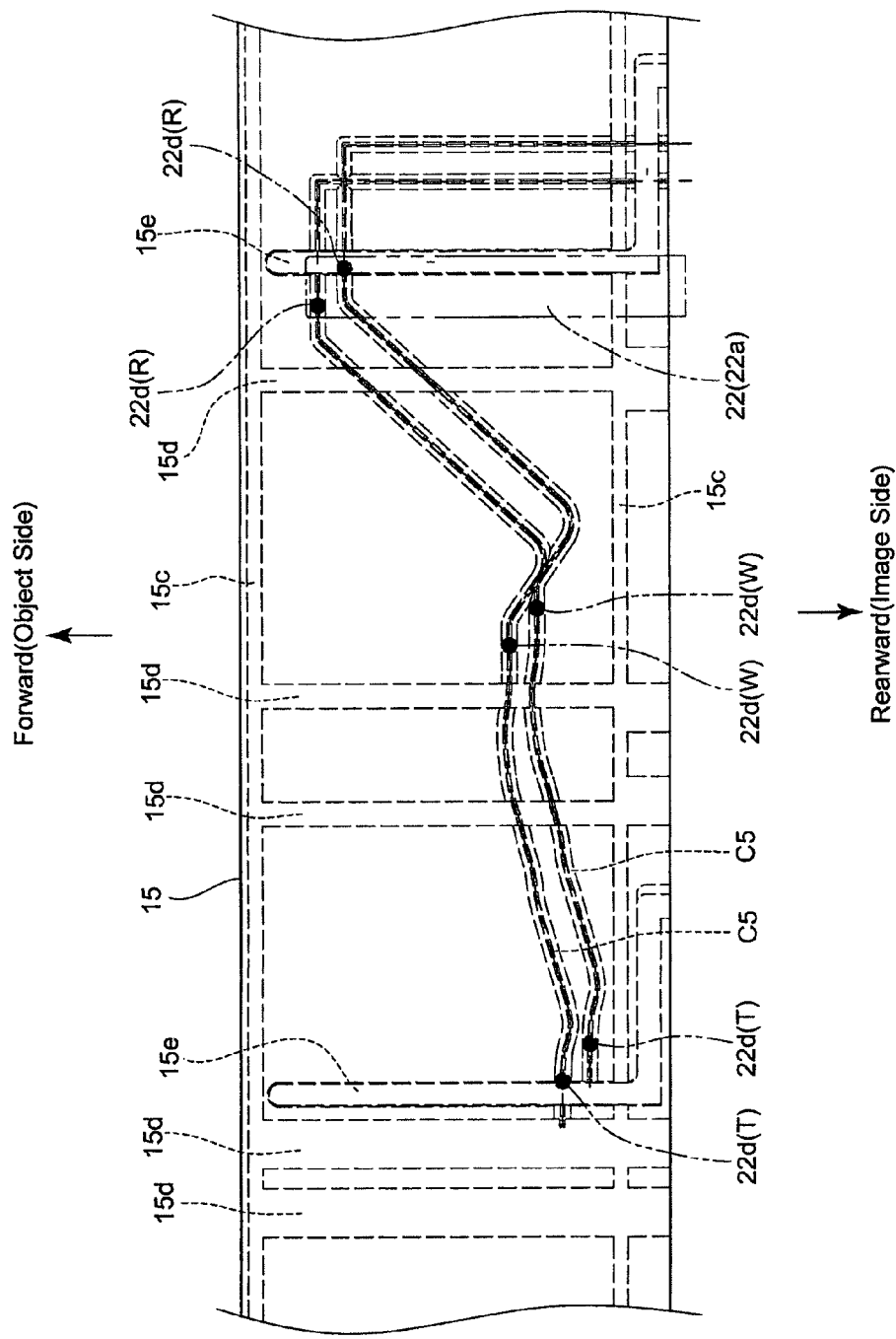
FIG. 13 is developed view of a first advancing/retracting ring.
Figure 14:
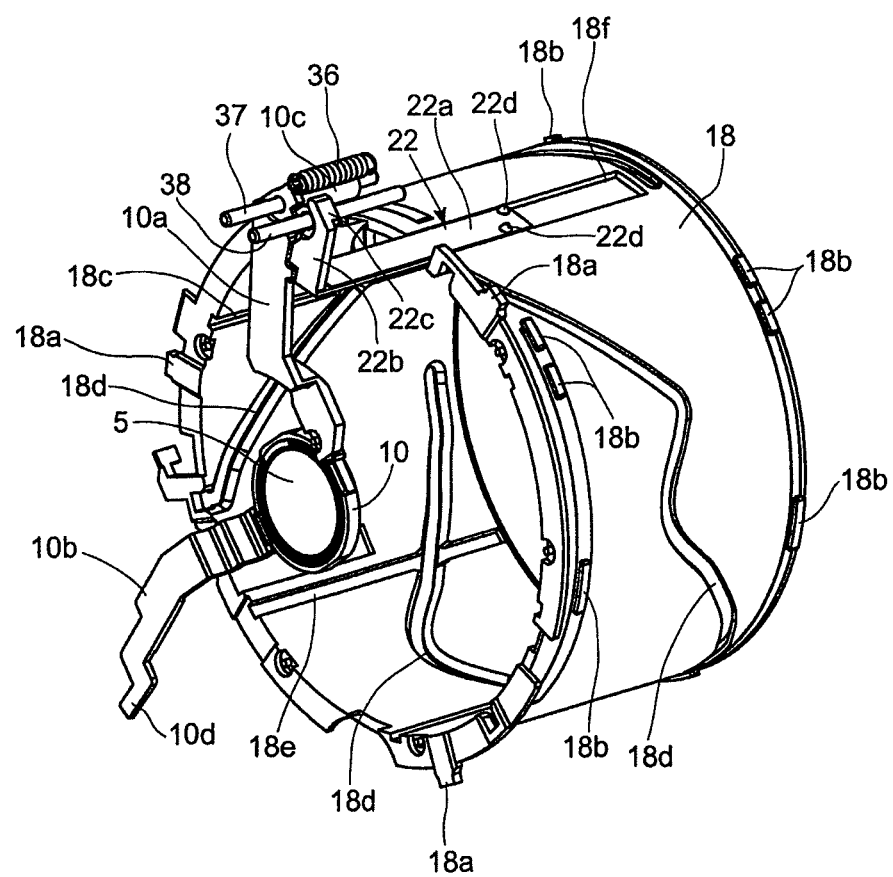
FIG. 14 is a perspective rearward view of the main components of the drive mechanism for the fifth lens group.
Figure 15:
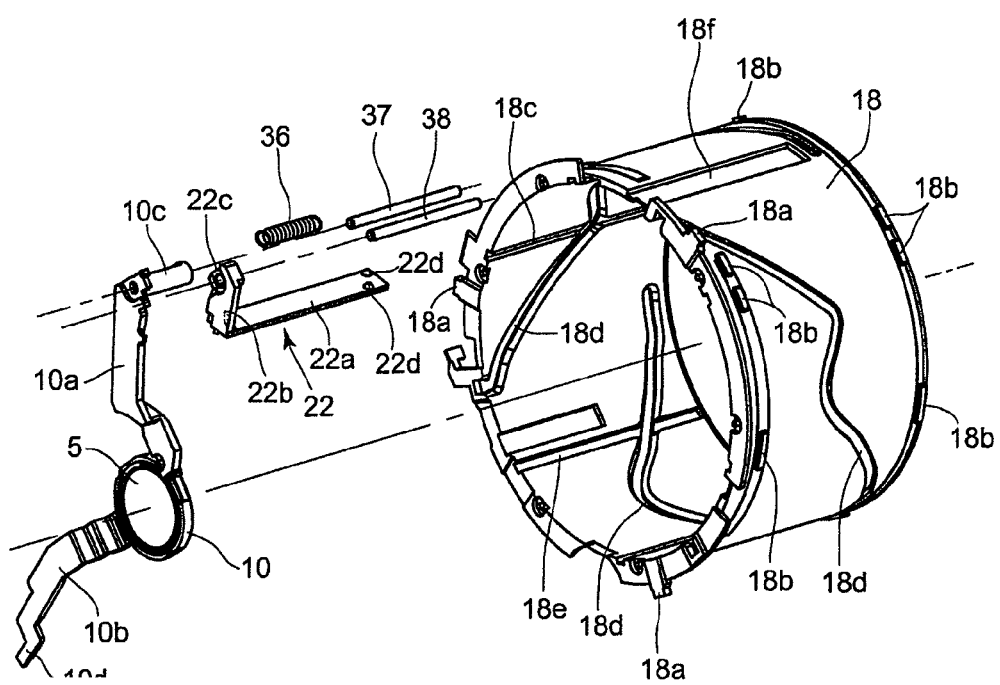
FIG. 15 is an exploded perspective rearward view of the main components of the drive mechanism for the fifth lens group.

A plurality of (three) cam followers 24 are attached onto the inner cam ring 19, in the vicinity of the rear end thereof, so as to project in the outer radial direction at different circumferential positions (see FIG. 4), and a plurality of (three) cam-ring guide through-grooves 18d are formed through the linear guide ring 18 at different circumferential positions (see FIGS. 6, 14 and 15). The cam followers 24 of the inner cam ring 19 are respectively fitted into the cam-ring guide through-grooves 18d of the linear guide ring 18 so that the cam followers 24 slide therealong. Furthermore, the outer ends of the cam followers 24 are respectively fitted into corresponding (three) rotational transmission grooves 15e, respectively, (see FIGS. 6 and 13) which are longitudinal grooves formed in the inner peripheral surface of the first advancing/retracting ring 15 and extend in the optical axis direction, so that the cam followers 24 slidably move along the rotational transmission grooves 15e in the optical axis direction, respectively. Upon the first advancing/retracting ring 15 rotating, the inner cam ring 19 rotates by the same rotational amount as that of the first advancing/retracting ring 15 via the engagement of the rotational transmission grooves 15e and the cam followers 24, so that in accordance with this rotational movement, the inner cam ring 19 moves in the optical axis direction via the cam followers 24 being guided by the cam-ring guide through-grooves 18d.

The third advancing/retracting ring 17 and the first-lens-group support ring 11 constitute a third-stage telescoping barrel. The third advancing/retracting ring 17 is guided linearly in the optical axis direction by a plurality of guide projections 17a (see FIG. 4), provided at different circumferential positions on the outer peripheral surface of the third advancing/retracting ring 17 and projecting therefrom in the vicinity of the rear end thereof, being slidably engaged with a plurality of linear guide grooves 16b (only one of which is shown in FIG. 6), respectively, which are longitudinal grooves provided at different circumferential positions in the inner periphery of the second advancing/retracting ring 16 and extend in the optical axis direction. A plurality of (three) cam followers 23 (see FIG. 4), which project radially inward and are supported in the third advancing/retracting ring 17 at different circumferential positions in the vicinity of the rear end thereof, are slidably engaged with corresponding (three) third advancing/retracting-control cam grooves CB formed on the outer peripheral surface of the inner cam ring 19. When the inner cam ring 19 is rotated, the cam followers 23 are guided by the third advancing/retracting-control cam grooves CB, respectively, thereby moving the third advancing/retracting ring 17 in the optical axis direction.

Figure 4:
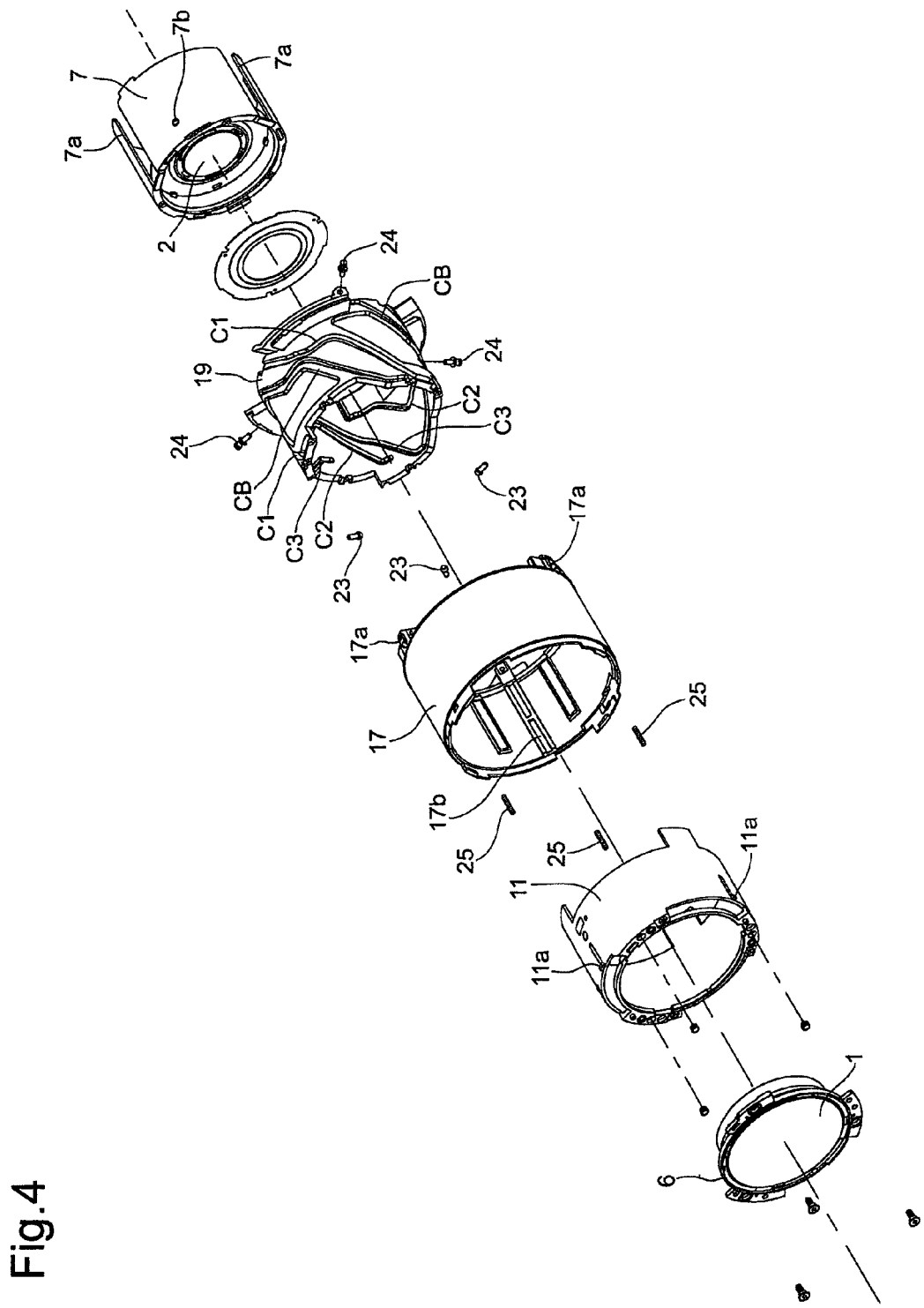
FIG. 4 is an exploded perspective view, viewed obliquely from the front, of some of the components of the zoom lens barrel of FIG. 1.

The first-lens-group support ring 11 is linearly guided in the optical axis direction by a plurality of guide projections 11a (see FIG. 4), provided at different circumferential positions on the outer peripheral surface of the first-lens-group support ring 11 and projecting therefrom in the vicinity of the front end thereof, being slidably engaged with corresponding linear guide grooves 17b (only one of which is shown in FIG. 4), respectively, which are longitudinal grooves provided at different circumferential positions in the inner periphery of the third advancing/retracting ring 17 and extend in the optical axis direction. A plurality of cam followers 11b (only one of which is shown in each of FIGS. 2 and 3) are provided, at different circumferential positions, in the vicinity of the rear end of the first-lens-group support ring 11 and project radially inwardly therefrom. The cam followers 11b are slidably engaged with corresponding first-lens-group cam grooves C1 (see FIG. 4), respectively, which are formed, at different circumferential positions, on the outer peripheral surface of the inner cam ring 19. When the inner cam ring 19 is rotated, the cam followers 11b are guided by the first-lens-group cam grooves C1, respectively, so that the first-lens-group support ring 11 moves in the optical axis direction. A compression spring 25 is inserted inside each linear guide grooves 17b with either end of the compression spring 25 pressed against an associated guide projection 11a and the rear end of an associated linear guide groove 17b. Backlash of the first-lens-group support ring 11 (cam followers 11b) and the third advancing/retracting ring 17 (cam followers 23) with respect to the first-lens-group cam grooves C1 and the third advancing/retracting-control cam grooves CB is removed by the compression springs 25.

A lens barrier mechanism 27 is mounted onto the front end of the third advancing/retracting ring 17, and the first-lens-group frame 6 is supported inside a front-end opening of the first-lens-group support ring 11. Since the specific configuration of the lens barrier mechanism 27 is common knowledge, a detailed explanation thereof is omitted herein. However, the lens barrier mechanism 27 can be briefly explained as utilizing the rotational force of the inner cam ring 19 to close barrier blades, as shown in the accommodation state in FIG. 1, and to open the barrier blades in the photographic/read-to-photograph state shown in FIGS. 2 and 3.

The positional relationship of the lens barrier mechanism 27 and the first lens group 1 with respect to the optical axis direction is determined by the profiles of the third advancing/retracting-control cam grooves CB and the first-lens-group cam grooves C1. In the zooming range between the wide-angle extremity shown in FIG. 2 and the telephoto extremity shown in FIG. 3, the lens barrier mechanism 27 and the first lens group 1 approach each other, and the vicinity of the front end of the first lens group 1 is maintained in a position entering a photographing aperture that is defined by the lens barrier mechanism 27. In other words, the third advancing/retracting-control cam grooves CB and the first-lens-group cam grooves C1 have roughly similar cam profiles in the photographing range. Whereas, due to the difference in cam profiles between the third advancing/retracting-control cam grooves CB and the first-lens-group cam grooves C1 when the zoom lens system is retracted from the wide-angle extremity shown in FIG. 2 to the accommodated state shown in FIG. 1, the third advancing/retracting ring 17 and the first-lens-group support ring 11 move relative to each other in the optical axis direction so that the distance between the lens barrier mechanism 27 and the first lens group 1 increases in the optical axis direction. Accordingly, in a photographing state/ready-to-photograph state (zooming range), the first lens group 1 approaches the photographic aperture defined by the lens barrier mechanism 27 to block out harmful peripheral light rays; and in the accommodated state, interference between the closed barrier blades of the lens barrier mechanism 27 and the first lens group 1 can be prevented.

The second-lens-group frame 7 and the third-lens-group support ring 12 are respectively provided inside the inner cam ring 19. The third-lens-group support ring 12 is linearly guided (movably) in the optical axis direction via a plurality of guide projections 12a (see FIG. 5), provided on a flange portion which is formed at the rear end of the third-lens-group support ring 12 and projects radially outwards, being slidably engaged with corresponding linear guide grooves 18e (shown in FIGS. 6, 14 and 15) which are longitudinal grooves which extend in the optical axis direction and are formed, at different circumferential positions, on the inner peripheral surface of the linear guide ring 18. The second-lens-group frame 7 is linearly guided in the optical axis direction via a plurality of linear guide keys 12b (shown in FIG. 5) formed, at different circumferential positions, on the outer peripheral surface of the third-lens-group support ring 12 being slidably engaged with corresponding linear guide grooves 7a (shown in FIG. 4) which are longitudinal grooves that extend in the optical axis direction.

A plurality of second-lens-group cam grooves C2 (see FIG. 4) and a plurality of third-lens-group cam grooves C3 (see FIG. 4) are formed in the inner peripheral surface of the inner cam ring 19. A plurality of cam followers 7b (only one of which is shown in FIG. 4), provided on the outer peripheral surface of the second-lens-group frame 7, are slidably engaged with the second-lens-group cam grooves C2, respectively. Similarly, a plurality of cam followers 12c (see FIG. 5), provided on the outer peripheral surface of the third-lens-group support ring 12, are slidably engaged with the third-lens-group cam grooves C3, respectively. Upon the inner cam ring 19 being rotated, the cam followers 7b are guided by the second-lens-group cam grooves C2, thereby moving the second-lens-group frame 7 in the optical axis direction, while the cam followers 12c are guided by the third-lens-group cam grooves C3, thereby moving the third-lens-group support ring 12 in the optical axis direction.

A third-lens-group unit 28 (see FIG. 5) is supported inside the third-lens-group support ring 12. The third-lens-group frame 8 is rotatably (swingably) supported in the third-lens-group unit 28 about a rotational axis 8a, the axis of which extends parallel to the optical axis O. The third-lens-group frame 8 is rotatable (swingable) between an insertion position, at which the third lens group 3 is inserted into the optical path so that the optical axis thereof is aligned with the optical axis O (see FIGS. 2 and 3), and a radially-retracted position (removed position), at which the third lens group 3 is removed away from the optical axis O and away from the optical path (see FIG. 1). The third-lens-group frame 8 is rotatably biased toward the insertion position, and the third-lens-group frame 8 is held at the insertion position by this biasing force when the zoom lens barrel ZL is in the photographing state/read-to-photograph state. Upon the third-lens-group support ring 12 being moved rearwardly in the optical axis direction while moving from the photographing state/read-to-photograph state to the accommodated state, the third-lens-group frame 8 is pressed by a cam projection 21a (see FIG. 7) which is provided on the lens-barrel rear plate 21 and thereby is rotated to the removed position. The third-lens-group unit 28 is further provided with an anti-shake mechanism (image-stabilizer) which suppresses image shake by moving the third lens group 3 in directions (a plane) orthogonal to the optical axis O with the third-lens-group frame 8 positioned at the insertion position; however, details of the anti-shake mechanism are omitted.

Figure 5:
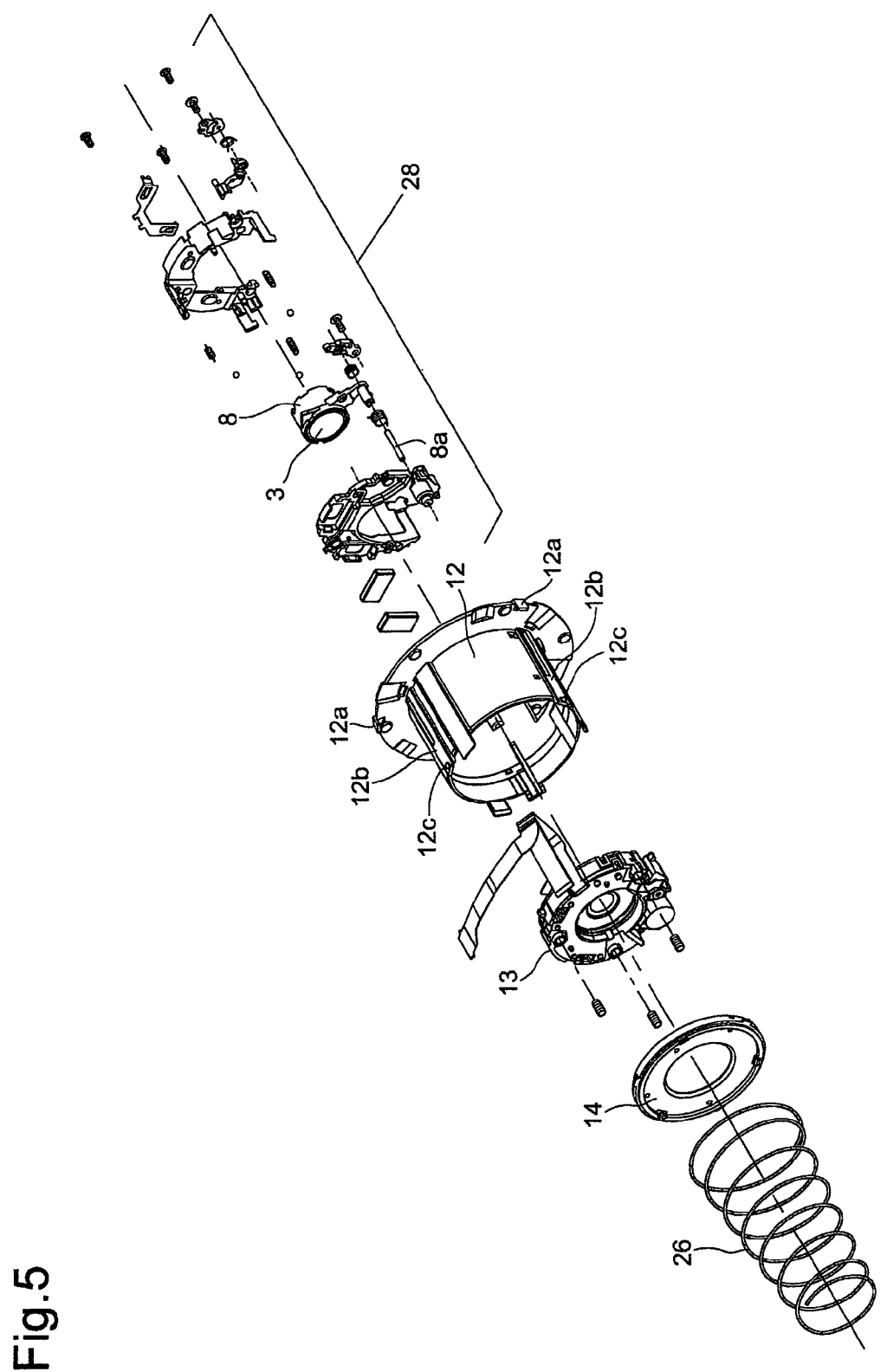
FIG. 5 is an exploded perspective view, viewed obliquely from the front, of other components of the zoom lens barrel of FIG. 1.

As shown in FIG. 5, a shutter mechanism 13 is supported at a front part of the third-lens-group unit 28 inside the third-lens-group support ring 12. A spring receiver 14 is supported at the front of the shutter mechanism 13, and a compression spring 26 is inserted between the spring receiver 14 and the second-lens-group frame 7. The compression spring 26 removes backlash that would otherwise occur between the second-lens-group frame 7 (cam follower 7b) against the second-lens-group cam grooves C2 and the third-lens-group support ring 12 (cam followers 12c) against the third-lens-group cam grooves C3.

As described above, the first-lens-group frame 6, the second-lens-group frame 7 and the third-lens-group frame 8 are supported by three (first through third stage) telescoping cylinders which can be advanced from, and accommodated in (retracted into) the stationary barrel 20, in the optical axis direction. In order to achieve stability in the supporting/engaging members (such as the linear guide grooves, guide projections, cam grooves and cam followers, via which the three-stage telescoping cylinders are configured), three (or more) of each such supporting/engaging members are provided at different circumferential positions.

The following is a description of a drive mechanism (second drive mechanism) for the fourth-lens-group frame (nut-driven lens frame) 9 and a drive mechanism (first drive mechanism) for the fifth-lens-group frame (cam-driven lens frame) 10. These drive mechanisms are schematically shown in FIGS. 9 through 12.

Figure 16:
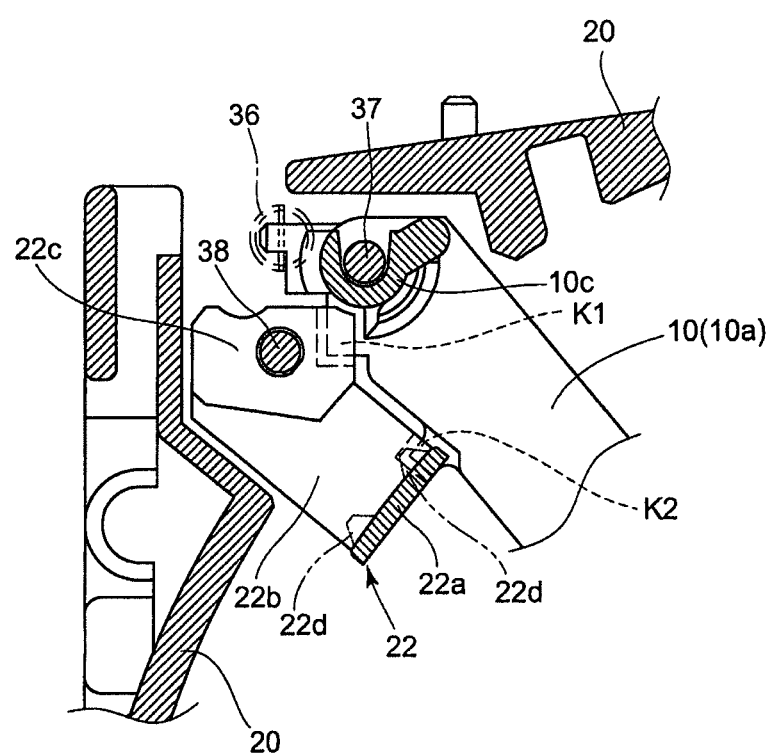
FIG. 16 is a partial cross-sectional view of components that constitute the drive mechanism of the fifth lens group.

The front and rear ends of a fourth-lens-group guide rod 33, an intermediary guide rod 34, a fifth-lens-group guide rod (lens-frame guide rod) 37 and an auxiliary guide rod 38 are supported (mounted) on the stationary barrel 20 and the lens-barrel rear plate 21, respectively (see FIGS. 7, and FIGS. 9 through 12). As shown in FIG. 16, the fifth-lens-group guide rod 37 and the auxiliary guide rod 38 are arranged on the outer periphery of the stationary barrel 20. The fourth-lens-group guide rod 33 and the intermediary guide rod 34 are likewise arranged on the outer periphery of the stationary barrel 20. The axes of the fourth-lens-group guide rod 33, the intermediary guide rod 34, the fifth-lens-group guide rod 37 and the auxiliary guide rod 38 extend substantially parallel to the optical axis O, respectively.

The fourth-lens-group frame 9 is provided with a first arm 9a and a second arm 9b which project in mutually different and outer radial directions, with respect to the center of a lens-holding portion of the fourth-lens-group frame 9 that holds the fourth lens group 4 (see FIG. 7). A cylindrical guide portion 9c, through which the fourth-lens-group guide rod 33 can slide, is formed on the outer end of the first arm 9a, and a rotational-restriction protrusion 9d, which is slidably engaged with rotational-restriction groove (not shown) that is formed as a longitudinal groove in the inner peripheral surface of the stationary barrel 20 and extending in the optical axis direction, is formed on the outer end of the second arm 9b. The fourth-lens-group frame 9 is linearly guided (moved) in the optical axis direction via the fourth-lens-group guide rod 33 and the cylindrical guide portion 9c, and rotation of the fourth-lens-group frame 9 about the fourth-lens-group guide rod 33 is restricted by the rotational-restriction groove of the stationary barrel 20 and the rotational-restriction protrusion 9d.

The fourth-lens-group frame 9 is biased to move forwardly in the optical axis direction by a fourth-lens-group biasing spring 30, which is configured as a torsional spring, which is pivotally supported on an outer surface of the stationary barrel 20. Due to the biasing force of the fourth-lens-group biasing spring 30, the first arm 9a of the fourth-lens-group frame 9 abuts against an intermediary member 35 from behind, with respect to the optical axis direction. The intermediary member 35 is provided with a cylindrical guide portion 35a, through which the intermediary guide rod 34 can slide, and a nut abutment portion 35b, which radially projects outward from the cylindrical guide portion 35a. The nut abutment portion 35b abuts against an AF nut 32 from behind, with respect to the optical axis direction. In other words, the intermediary member 35 is sandwiched between the AF nut 32 and the fourth-lens-group frame 9 (the first arm 9a) and is maintained in a held (sandwiched) state on either side (front and rearward sides) thereof via the fourth-lens-group biasing spring 30.

The AF motor 31 is configured of a stepping motor mounted to the stationary barrel 20 and is provided with a feed screw 31a, which is a rotational shaft that project forwardly in the optical axis direction. The rotational axis of the feed screw 31a is substantially parallel to the optical axis O. The AF nut 32 engages with the feed screw 31a while being rotationally-restricted from rotating about the rotational axis of the feed screw 31a by the AF nut 32 engaging with a guide groove (not shown) that is formed on the stationary barrel 20. When the feed screw 31a is rotated forwardly and reversibly, the AF nut 32 moves along the optical axis in a forward and rearward direction. The intermediary member 35 is also rotationally-restricted in a similar manner to that of the AF nut 32. Upon the AF motor 31 being driven to move the AF nut 32 in the rearward optical axis direction, the fourth-lens-group frame 9 is pressed via the intermediary member 35 against the biasing force of the fourth-lens-group biasing spring 30 so that the fourth-lensgroup frame 9 moves rearwardly in the optical axis direction. Upon the AF motor 31 being driven to move the AF nut 32 forwardly in the optical axis direction, the fourth-lens-group frame 9 and the intermediary member 35 move forwardly in the optical axis direction, by the biasing force of the fourth-lens-group biasing spring 30, while following the forward movement of the AF nut 32.

The fifth-lens-group frame 10 is provided with a first arm 10a and a second arm 10b which project in mutually different directions toward outer radial directions, with respect to the center of a lens-holding portion of the fifth-lens-group frame 10 that holds the fifth lens group 5 (see FIGS. 7, 14 and 15). A cylindrical guided portion 10c, through which the fifth-lens-group guide rod 37 can slide, is formed on the outer end of the first arm 10a (see FIG. 16), and a rotational-restriction protrusion 10d, which is slidably engaged with rotational-restriction groove (not shown) that is formed as a longitudinal groove in the inner peripheral surface of the stationary barrel 20 and extending in the optical axis direction, is formed on the outer end of the second arm 10b. The fifth-lens-group frame 10 is linearly guided (moved) in the optical axis direction via the fifth-lens-group guide rod 37 and the cylindrical guided portion 10c, and rotation of the fifth-lens-group frame 10 about the fifth-lens-group guide rod 37 is restricted by the rotational-restriction groove of the stationary barrel 20 and the rotational-restriction protrusion 10d.

The fifth-lens-group frame 10 is movably biased forwardly in the optical axis direction (in a direction approaching the fourth-lens-group frame 9) by a fifth-lens-group biasing spring (biasing member) 36, which is configured as a tension spring, one end of which is engaged onto a spring hook provided on the stationary barrel 20 and the other end of which is engaged onto a spring hook provided on the first arm 10a (see FIGS. 9 through 12); due to this biasing force (by the fifth-lens-group biasing spring 36), the first arm 10a of the fifth-lens-group frame 10 abuts against a fifth-lens-group drive bar (cam-driven member) 22 from behind, in the rearward optical axis direction.

As shown in FIGS. 14 and 15, the fifth-lens-group drive bar 22 is provided with a long and thin plate-shaped guide key part 22a which is elongated in the optical axis direction, an upright part 22b which is bent toward a radially outward direction (in a direction orthogonal to the optical axis) at the rear end of the guide key part 22a, and a guided part 22c, into which the auxiliary guide rod 38 is slidably inserted, formed on the upright part 22b. An end portion of the first arm 10a (of the fifth-lens-group frame 10) that is nearest to the cylindrical guided portion 10c comes in contact with the upright part 22b (see FIG. 14). The contacting locations between the first arm 10a and the upright part 22b are indicated by K1 and K2 in FIG. 16.

As shown in FIG. 14, the guide key part 22a of the fifth-lens-group drive bar 22 is slidably fitted into a key guide groove (bottomed linear guide groove) 18f, which is an elongated groove formed on the outer peripheral surface of the linear guide ring 18 and extending in the optical axis direction; the guide key part 22a can slide along the elongated direction (i.e., the optical axis direction) of the key guide groove 18f. The guide key part 22a is restricted (prevented) from moving in the lateral direction (circumferential direction about the optical axis O) relative to the key guide groove 18f, and the fifth-lens-group drive bar 22 is linearly guided in the optical axis direction via engagement of the guide key part 22a with the key guide groove 18f. Furthermore, any flexing of the fifth-lens-group drive bar 22 can be suppressed by the engagement between the auxiliary guide rod 38 and the guided part 22c.

The key guide groove 18f is a bottomed groove formed on the outer peripheral surface of the linear guide ring 18 and has a predetermined depth. The radial position of the fifth-lens-group drive bar 22, with respect to a radial direction from the optical axis O, is determined by the guide key part 22a being placed onto the base (bottom) surface of the key guide groove 18f. The outer surface profile of the guide key part 22a forms a partial cylindrical shape in accordance with the peripheral (cylindrical) shape of the linear guide ring 18 (see FIG. 16), and the outer peripheral surface of the guide key part 22a is substantially flush with the outer peripheral surface of the linear guide ring 18 when the guide key part 22a is fitted in and supported by the key guide groove 18f. The base surface of the key guide groove 18f and the corresponding inner surface (on the optical axis O side) of the guide key part 22a are both flat surfaces (i.e., are not curved). A pair of cam followers 22d are provided on the outer peripheral surface of the guide key part 22a in the vicinity of the front end thereof; the cam followers 22d project radially outward from the outer peripheral surface of the linear guide ring 18 and are slidably engaged with a pair of fifth-lens-group cam grooves C5, respectively, formed on the inner peripheral surface of the first advancing/retracting ring 15 (see FIGS. 1 through 3, and FIG. 13). In FIG. 13, the letters '(R)', '(W)' and '(T)' added to the designator '22d' refer to the positions of the cam followers 22d in the fifth-lens-group cam grooves C5 at the fully-retracted state (accommodated state) (FIG. 1), the wide-angle extremity (FIG. 2) and the telephoto extremity (FIG. 3) of the zoom lens barrel ZL, respectively.

As shown in FIG. 13, a plurality of the communicably connecting grooves 15d and a plurality of the rotational transmission grooves 15e are formed on the inner peripheral surface of the first advancing/retracting ring 15 at mutually different locations, with respect to the circumferential direction; the contours of the fifth-lens-group cam grooves C5 cross through the communicably connecting grooves 15d and the rotational transmission grooves 15e. Accordingly, in order to prevent the cam followers 22d from falling out of the fifth-lens-group cam grooves C5 at the intersecting positions between the fifth-lens-group cam grooves C5 and the communicably connecting grooves 15d and at the intersecting positions between the fifth-lens-group cam grooves C5 and the rotational transmission grooves 15e, the cam followers 22d and the fifth-lens-group cam grooves C5 have been respectively provided as pairs, so that at least one of the pair of cam followers 22d is always engaged with an associated fifth-lens-group cam groove C5.

When the first advancing/retracting ring 15 is rotated, the cam followers 22d are guided by the fifth-lens-group cam grooves C5 while the fifth-lens-group drive bar 22 moves in the optical axis direction. When the fifth-lens-group drive bar 22 is moved rearwardly in the optical axis direction, the fifth-lens-group frame 10 is rearwardly pushed by the upright part 22b of the fifth-lens-group drive bar 22 against the biasing force of the fifth-lens-group biasing spring 36 thereby moving the fifth-lens-group frame 10 rearward in the optical axis direction. Upon the fifth-lens-group drive bar 22 being moved forwardly in the optical axis direction, the fifth-lens-group frame 10 follows the fifth-lens-group drive bar 22 by the biasing force of the fifth-lens-group biasing spring 36 and also moves forwardly in the optical axis direction. In other words, the fifth-lens-group frame 10 moves with the fifth-lens-group drive bar 22 in the optical axis direction. Since the first advancing/retracting ring 15, which guides the movement of the fifth-lens-group drive bar 22, advances/retracts (moves forwardly/rearwardly) in the optical axis direction and rotates relative to the stationary barrel 20 while being guided by lead groove portions of the first-stage guide grooves 20*a*, the fifth-lens-group frame 10 (in this state) is positionally controlled by the movement thereof via the fifth-lens-group cam grooves C5 (via the fifth-lens-group drive bar 22) combined with the movement of the first advancing/retracting ring 15 in the optical axis direction.

The operation of the zoom lens barrel ZL having the above-described configuration will be hereinafter described. In the accommodated (fully-retracted) state shown in FIG. 1, all of the movable members that constitute the zoom lens barrel ZL are space efficiently accommodated within the stationary barrel 20. The fifth lens group 5 is positioned close to the optical filter 42, and the fourth lens group 4 is positioned close to the fifth lens group 5. The third-lens-group frame 8 has been pressed and moved by the lens-barrel rear plate 21 provided on the lens-barrel rear plate 21 and is held at a radially-removed position, so that the third lens group 3 is positioned at a radially outer position from the fourth lens group 4 and the fifth lens group 5 (i.e., the third lens group 3 is arranged side by side with the fourth lens group 4 and fifth lens group 5 in a direction orthogonal to the optical axis). The second lens group 2 is accommodated by being inserted, from the front side, inside the third-lens-group support ring 12 to fit inside the shutter mechanism 13. The first lens group 1, which has the largest diameter out of the lens groups which form the photographing optical system, is also partially inserted into the third-lens-group support ring and is positioned close to the second lens group 2. Accordingly, a compact accommodated state (with respect to the optical axis direction) can be achieved.

Upon a transition signal, for transferring (advancing) the zoom lens barrel ZL from the accommodated state to the ready-to-photograph state (via, e.g., a main switch provided on the camera body being switched ON), being input to a control circuit, which controls the operations of the zoom lens barrel ZL, the zoom motor 39 is driven in the lens-barrel advancing direction (forward direction). The driving force of the zoom motor 39 is transmitted to the first advancing/retracting ring via the zoom gear train 40, so that the first advancing/retracting ring 15 rotates in accordance with the lead groove portions of the first-stage guide grooves 20*a* while advancing (moving forward) in the optical axis direction relative to the stationary barrel 20. The linear guide ring 18 is advanced (moved forwardly in the optical axis direction) with the first advancing/retracting ring 15 without rotating.

The rotation of the first advancing/retracting ring 15 is transmitted to the inner cam ring 19, and the inner cam ring 19 advances (moves) forwardly in the optical axis direction, relative to the first advancing/retracting ring 15 and the linear guide ring 18, while rotating in accordance with the cam-ring guide through-grooves 18*d*. The second advancing/retracting ring 16 is forwardly advanced, with the inner cam ring 19, without rotating. Upon the inner cam ring 19 being rotated, the third advancing/retracting ring 17 and the first-lens-group support ring 11 are forwardly advanced (moved) in the optical axis direction relative to the second advancing/retracting ring 16 and the inner cam ring 19, without rotating, in accordance with the third advancing/retracting-control cam grooves CB and the first-lens-group cam grooves C1, which are formed on the outer peripheral surface of the inner cam ring 19. Furthermore, upon the inner cam ring 19 being rotated, the second-lens-group frame 7 and the third-lens-group support ring 12 advance (move) forwardly in the optical axis direction, relative to the second advancing/retracting ring 16 and the inner cam ring 19, without rotating, respectively, in accordance with the second-lens-group cam grooves C2 and the third-lens-group cam grooves C3 which are formed in the inner peripheral surface of the inner cam ring 19. Upon the third-lens-group support ring 12 being moved forwardly in the optical axis direction, the pressing force applied on the third-lens-group frame 8 from the cam projection 21*a* is released, so that the third-lens-group frame 8 rotates (swings) from the radially-removed position to the insertion position (optical axis position). In this manner, the positions of the first lens group 1, the second lens group 2 and the third lens group 3, with respect to the optical axis direction, are controlled via the inner cam ring 19.

Upon the first advancing/retracting ring 15 being rotated, the fifth-lens-group drive bar 22 moves, without rotating, in the optical axis direction relative to the first advancing/retracting ring 15 and the linear guide ring 18 in accordance with the fifth-lens-group cam grooves C5 which are formed in the inner peripheral surface of the first advancing/retracting ring 15. As shown in FIG. 13, in each fifth-lens-group cam groove C5, the section starting at position '(R)' when the cam followers 22*d* is at the accommodated position (in the accommodated state) is inclined, relative to the optical axis, and extends in a rearward direction toward position '(W)' of the cam followers 22*d* at the wide-angle extremity; and the first advancing/retracting ring 15 itself moves forwardly in the optical axis direction when the zoom lens barrel ZL is advanced from the accommodated state. Accordingly, when the zoom lens barrel ZL is advanced (telescoped forward) from the accommodated state, the fifth-lens-group drive bar 22 moves rearwardly in the optical axis direction relative to the first advancing/retracting ring 15, while moving forward in the optical axis direction relative to the stationary barrel 20 and the lens-barrel rear plate 21, which are stationary members. The fifth-lens-group frame 10, which is biased forwardly in the optical axis direction by the fifth-lens-group biasing spring 36, is pressed rearwardly in the optical axis direction by the fifth-lens-group drive bar 22, against the biasing force of the fifth-lens-group biasing spring 36, while the fifth-lens-group frame 10 forwardly moves in the optical axis direction by the forward movement of the fifth-lens-group drive bar 22, which occurs due to the forward movement of the first advancing/retracting ring 15 in the optical axis direction, so that the fifth lens group 5 moves away from the image sensor 41 (see movement path Q5 in FIG. 8).

Upon the transition signal for transferring (advancing) the zoom lens barrel ZL from the accommodated state to the ready-to-photograph state being input to the control circuit, the AF motor 31 is also driven, in addition to the zoom motor 39, so that the AF nut 32 is moved forwardly in the optical axis direction via the rotation of the feed screw 31*a*. Upon the AF nut 32 being moved in this manner, the intermediary member 35 and the fourth-lens-group frame 9 follow the movement of the AF nut 32 in the forward optical axis direction by the biasing force of the fourth-lens-group biasing spring 30 (see movement path Q4 in FIG. 8).

Upon the zoom lens barrel ZL transferring to the wide-angle extremity shown in FIG. 2, the transition from the accommodated state to the ready-to-photograph state is completed. In the ready-to-photograph state, the focal length of the photographing optical system can be changed in a photographing range between the wide-angle extremity shown in FIG. 2 and the telephoto extremity shown in FIG.

3, and upon a signal for selecting a predetermined focal length (e.g., an operation of a zoom switch that is provided on the camera body) being input into the control circuit, the zoom motor 39 is driven to rotate the first advancing/retracting ring 15 and the inner cam ring 19, and the first lens group 1, the second lens group 2, the third lens group 3 and the fifth lens group 5 are moved along the movement paths Q1, Q2, Q3 and Q5, respectively, in accordance with the cam grooves C1, C2, C3 and C5, respectively, which are formed in the inner cam ring (cam grooves C1 through C3) and the first advancing/retracting ring 15 (cam groove C5).

In the ready-to-photograph state, since the first advancing/retracting ring 15 is guided by the circumferential-direction grooves of the first-stage guide grooves 20a, via the guide projections 15a, and rotates at a stationary position without changing position with respect to the optical axis direction, the fifth-lens-group movement path Q5 corresponds to the cam contour of each fifth-lens-group cam groove C5. As shown in FIG. 8, in the photographing range, the fifth-lens-group movement path Q5 moves the fifth lens group 5 forwardly in the optical axis direction starting from the wide-angle extremity and travelling toward the telephoto extremity until a midway position therebetween, and thereafter, upon the fifth lens group 5 continuing to move toward the telephoto extremity, the fifth-lens-group movement path Q5 guides the fifth lens group 5 to move rearwardly in the optical axis direction. The cam contour of each fifth-lens-group cam groove C5 in zoom range shown in FIG. 13 (between the wide-angle extremity position (W) and the telephoto extremity position (T) of the cam followers 22d) traces the fifth-lens-group movement path Q5. Furthermore, the fifth-lens-group frame 10 moves in accordance with the optical-axis-direction movement of the fifth-lens-group drive bar 22, in accordance with the cam contours of the fifth-lens-group cam grooves C5, via the rotation of the first advancing/retracting ring 15. It should be noted that since, unlike the first advancing/retracting ring 15, the inner cam ring 19 moves in the optical axis direction while rotating in accordance with the cam-ring guide through-grooves 18d also in the ready-to-photograph state/photographing state, cam contours (profiles) of the cam grooves C1, C2 and C3 do not merely trace the movement paths Q1, Q2 and Q3, respectively.

Figure 9:
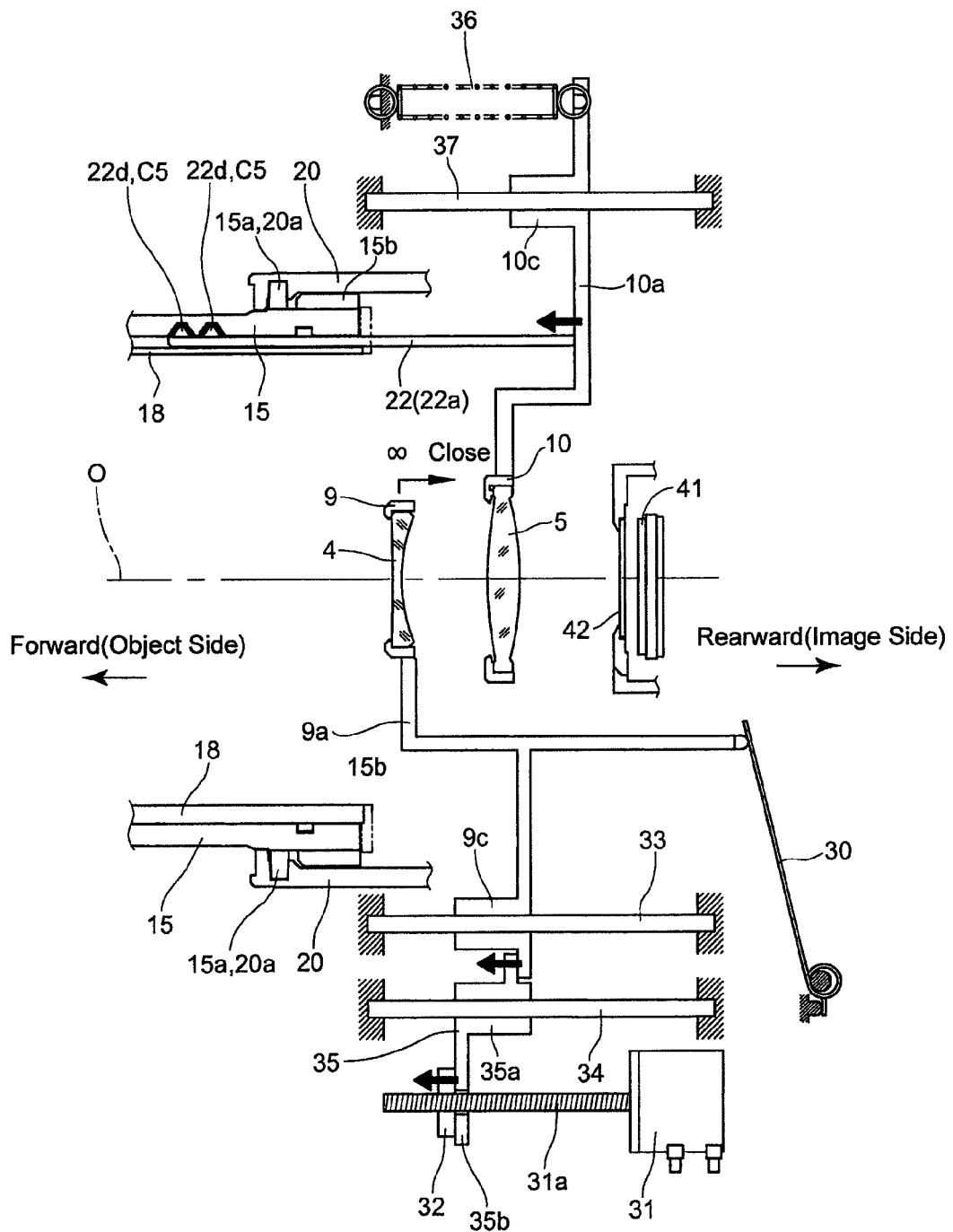
FIG. 9 is a cross-sectional view showing the positional relationship of the drive mechanisms of the fourth and fifth lens groups at the wide-angle extremity.

Furthermore, when the focal length of the photographing optical system is changed within the zooming range between the wide-angle extremity and the telephoto extremity (i.e., when zooming is performed), the AF motor 31 is driven to advance/retract the AF nut 32 in the optical axis direction, and the fourth lens group 4 moves according to the movement path Q4 shown in FIG. 8. The movement path Q4 indicates the positional changes (reference cam) of the fourth lens group 4 during zooming; this movement path Q4 also constitutes a reference path by which focusing is based. Furthermore, upon a signal for focusing on an object being input into the control circuit, the AF motor 31 moves the AF nut 32 in the optical axis direction so that a focusing operation is performed by moving the fourth lens group 4 with respect to the movement path Q4. As shown in FIG. 9, in the focusing operation, the fourth lens group moves rearwardly in the optical axis direction upon focusing on an object at infinity toward an object at a close distance. The movement path Q4 of FIG. 8 is based on the position of the fourth lens group 4 with respect to the optical axis direction when focused on an object at infinity.

Upon a transition signal for transferring (retracting) the zoom lens barrel ZL from the ready-to-photograph state/photographing state to the accommodated state (via, e.g., the aforementioned main switch provided on the camera body being switched OFF) being input to a control circuit, a reverse operation to the above-described advancing operation from the accommodated state is performed by driving the zoom motor 39 and the AF motor 31. During a retracting operation (accommodating operation), together with the moving operation of the first advancing/retracting ring 15 which rotates while moving rearwardly in the optical axis direction by the driving force of the zoom motor 39, the fifth-lens-group drive bar 22 and the fifth-lens-group frame 10, which are elastically combined together by the fifth-lens-group biasing spring 36, forwardly move in the optical axis direction according to the fifth-lens-group cam grooves C5 relative to the first advancing/retracting ring 15, whereas the fifth-lens-group drive bar 22 and the fifth-lens-group frame 10 move rearwardly in the optical axis direction relative to the stationary barrel 20 and lens-barrel rear plate 21, which are stationary members. Furthermore, the fourth-lens-group frame 9 approaches the fifth-lens-group frame 10 against the biasing force of the fourth-lens-group biasing spring 30 due to the rearward movement of the AF nut 32 in the optical axis direction via the AF motor 31. The first-lens-group frame 6 (first-lens-group support ring 11), the second-lens-group frame 7 and the third-lens-group frame 8 (third-lens-group support ring 12) respectively move rearwardly in the optical axis direction together with the moving operation of the inner cam ring 19, which moves rearwardly in the optical axis direction while rotating by the driving force of the zoom motor 39; and the third-lens-group frame 8, partway through the rearward movement thereof, abuts against the cam projection 21a and moves from the insertion position (on axis position) to the radially-removed position.

In the zoom lens barrel ZL, which operates in the above-described manner, the first lens group 1, the second lens group 2, the third lens group 3 and the fifth lens group 5 are positionally controlled via the first advancing/retracting ring 15 and the inner cam ring 19, which are driven by the zoom motor 39; whereas, the fourth lens group 4 is positionally controlled, within an driving range M shown in FIG. 8, independently from the other lens groups by the AF nut 32, which is driven by the AF motor 31. As described above, the position of the fourth lens group 4 in the optical axis direction is controlled to move according to the movement path Q4 when a transferring operation is performed to transfer the zoom lens barrel ZL from the accommodated state to the ready-to-photograph state and when a zooming operation is performed in the ready-to-photograph state/photographing state; and additionally, a focusing operation is performed using the movement path Q4 as a reference position. When the other lens groups, i.e., the first through third and fifth lens groups 1 through 3 and 5 are respectively moved in accordance with the movement paths Q1, Q2, Q3 and Q5, the fourth-lens-group frame 9, which holds the fourth lens group 4, does not interfere with any of the lens frames of the first through third and fifth lens groups 1 through 3 and 5 nor with any other movable members within the zoom lens barrel ZL, so long as the fourth lens group 4 moves (in the optical axis direction) in accordance with the movement path Q4. On the other hand, in a state where the fourth lens group 4 has largely deviated from the movement path Q4, it becomes necessary to consider the possibility of the fourth-lens-group frame 9 interfering with the third-lens-group unit 28 (third-lens-group frame 8) (located in front of the fourth-lens-group frame 9) and interfering with the fifth-lens-group frame 10 (located behind the fourth-lens-group frame 9).

Figure 11:
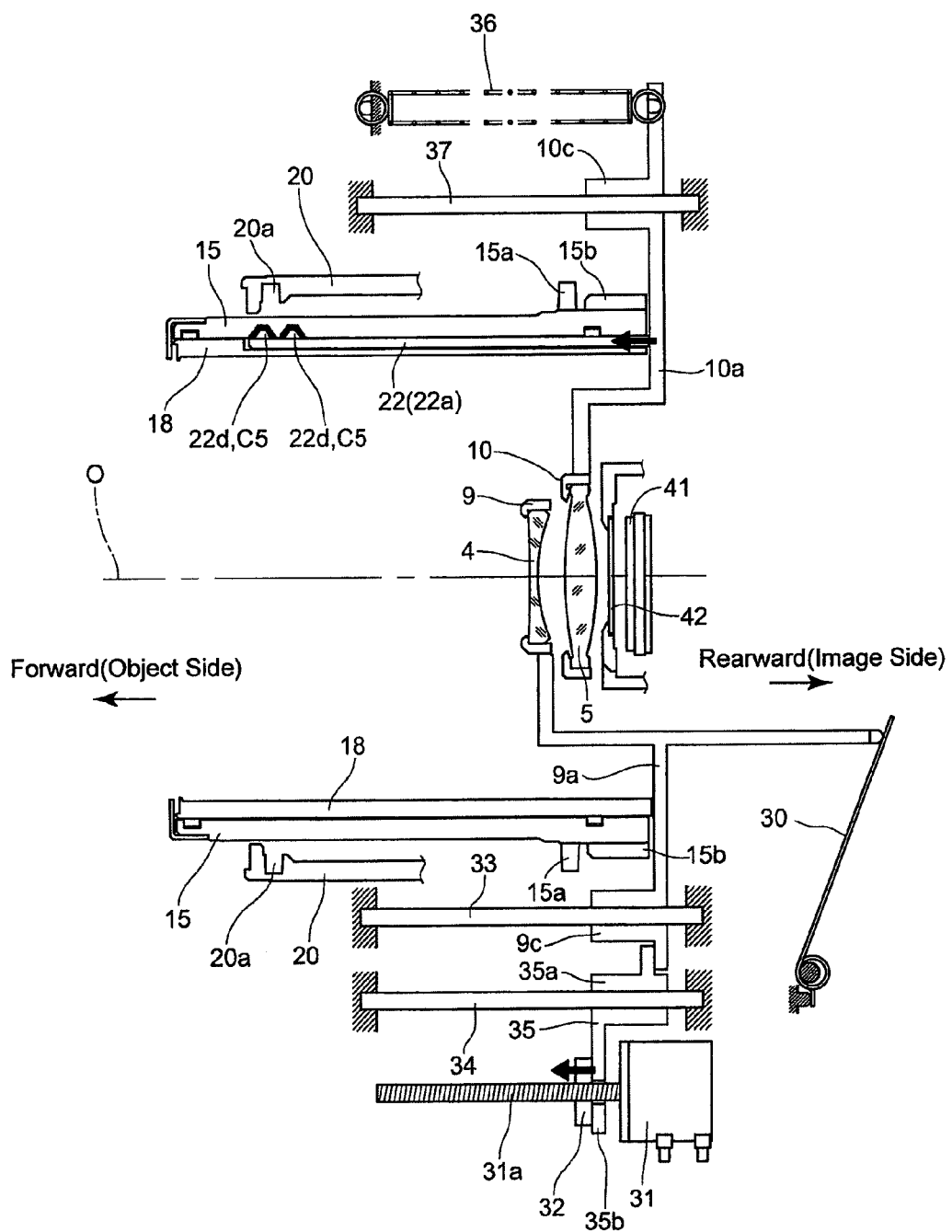
FIG. 11 is a cross-sectional view showing the positional relationship between the drive mechanisms of the fourth and fifth lens groups at the wide-angle extremity.
Figure 12:
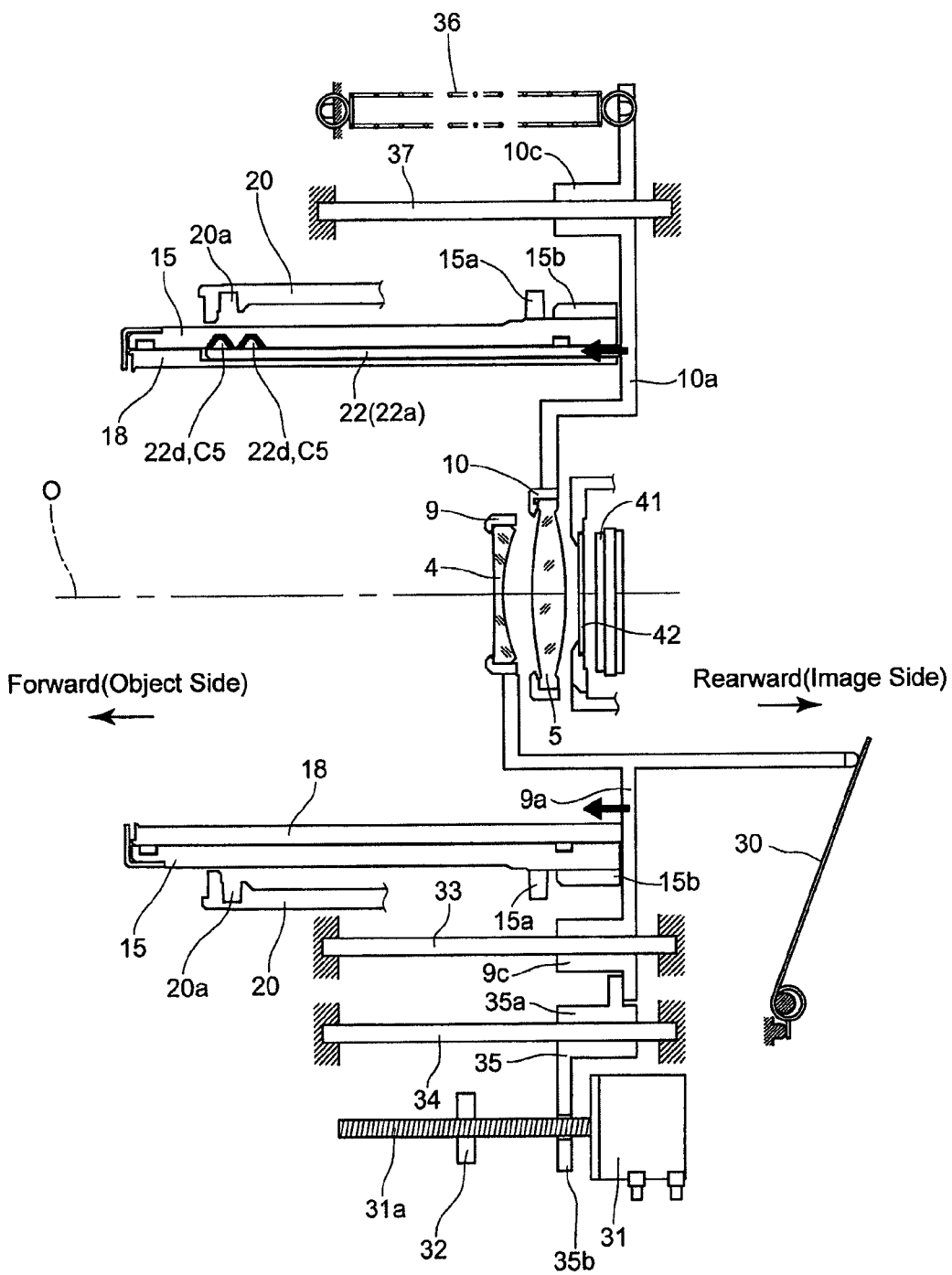
FIG. 12 is a cross-sectional view showing the positional relationship between the drive mechanisms of the fourth and fifth lens groups in the case where only an AF nut is moved forwardly in the optical axis direction (toward the object side) from the accommodated state.

The fourth-lens-group frame 9 is biased to move forwardly in the optical axis direction by the fourth-lens-group biasing spring 30, and the forward movement of the fourth-lens-group frame 9 in the optical axis direction is restricted by the intermediary member 35 abutting against the AF nut 32. Accordingly, in the case where the third-lens-group support ring 12 moves rearwardly in the optical axis direction so that the third-lens-group unit 28 abuts against the fourth-lens-group frame 9, in a state where the fourth lens group 4 is forwardly positioned from the movement path Q4, the driving mechanism (which includes the zoom motor 39) can be operated without exhibiting an excess load near the fourth-lens-group frame 9 by pushing the fourth-lens-group frame 9 away from the AF nut 32 against the fourth-lens-group biasing spring 30. Furthermore, in a state where the third-lens-group support ring 12 is moving forwardly in the optical axis direction or is stopped (stationary), if the AF nut 32 has excessively moved forward from the position corresponding to the movement path Q4, since the fourth-lens-group frame 9 is prevented from moving further forward from the time at which the fourth-lens-group frame 9 abuts the third-lens-group support ring 12 or the third-lens-group unit 28, so that only the AF nut 32 is moved forward, an excessive load is also not applied to the fourth-lens-group frame 9. For example, FIG. 11 schematically shows the drive mechanism of the fourth-lens-group frame 9 and the drive mechanism of the fifth-lens-group frame 10 when the zoom lens barrel ZL is in the accommodated state. If only the AF motor 31 is driven to the (zoom lens barrel ZL) advancing direction from this accommodated state without driving the zoom motor 39, the AF nut 32 moves forwardly away from the intermediary member 35, as shown in FIG. 12, so that no load is applied onto the fourth-lens-group frame 9 or the other movable members. In other words, in the case where some kind of malfunction occurs in the drive mechanism of the fourth-lens-group frame 9, the relationship between the fourth-lens-group frame 9 and the members that are positioned further forward (the biasing direction of the fourth-lens-group biasing spring 30) in the optical axis direction from the fourth-lens-group frame 9 is such that the load on the drive mechanism of the fourth-lens-group frame 9 can be absorbed by a configuration in which a space (interval) is provided between the AF nut 32 and the fourth-lens-group frame 9. Furthermore, as can be understood from the movement path Q4 shown in FIG. 8, since, when in the accommodated state, the fourth lens group 4 is positioned near the rearward end of the driving range M, the AF nut 32 is driven to a position that is further rearward (in the optical axis direction) than the position indicated in FIG. 11 so that there is no risk of a load being exerted onto the fourth-lens-group frame 9.

On the other hand, since the movement of the fourth-lens-group frame 9 further forward from a position at which the fourth-lens-group frame 9 abuts the AF nut 32 via the intermediary member 35 is mechanically restricted, in the case where the fourth-lens-group frame 9 and the fifth-lens-group frame 10, which is positioned behind the fourth-lens-group frame 9, come in contact (collide) with each other due to a malfunction, etc., occurring in the drive mechanism, the fourth-lens-group frame 9 cannot be relieved (allowed to move) forwardly in order to absorb the excess load being exerted thereon. Specifically, as shown in FIG. 8 as a hatched interference region P, there is a chance (risk) of the fourth-lens-group frame 9 and the fifth-lens-group frame 10 interfering with each other at a portion of the driving range M of the fourth lens group 4 when the fourth lens group 4 is positioned rearward in the optical axis direction from the movement path Q5 of the fifth lens group 5. In order to avoid an excess load acting between the fourth-lens-group frame 9 and the fifth-lens-group frame 10 in the interference region P, the zoom lens barrel ZL of the illustrated embodiment is provided with a load-absorbing structure in the drive mechanism of the fifth-lens-group frame 10.

FIG. 9 schematically shows a state in which the fourth-lens-group frame 9 and the fifth-lens-group frame 10 are correctly positioned on the movement paths Q4 and Q5, respectively (see FIG. 8), at the wide-angle extremity. In this state, a predetermined interval in the optical axis direction is maintained between the fourth lens group 4 and the fifth lens group 5, and forward movement in the optical axis direction of the fourth-lens-group frame 9 is restricted by the AF nut 32 and the intermediary member 35, and forward movement in the optical axis direction of the fifth-lens-group frame 10 is restricted by the fifth-lens-group drive bar 22.

Figure 10:
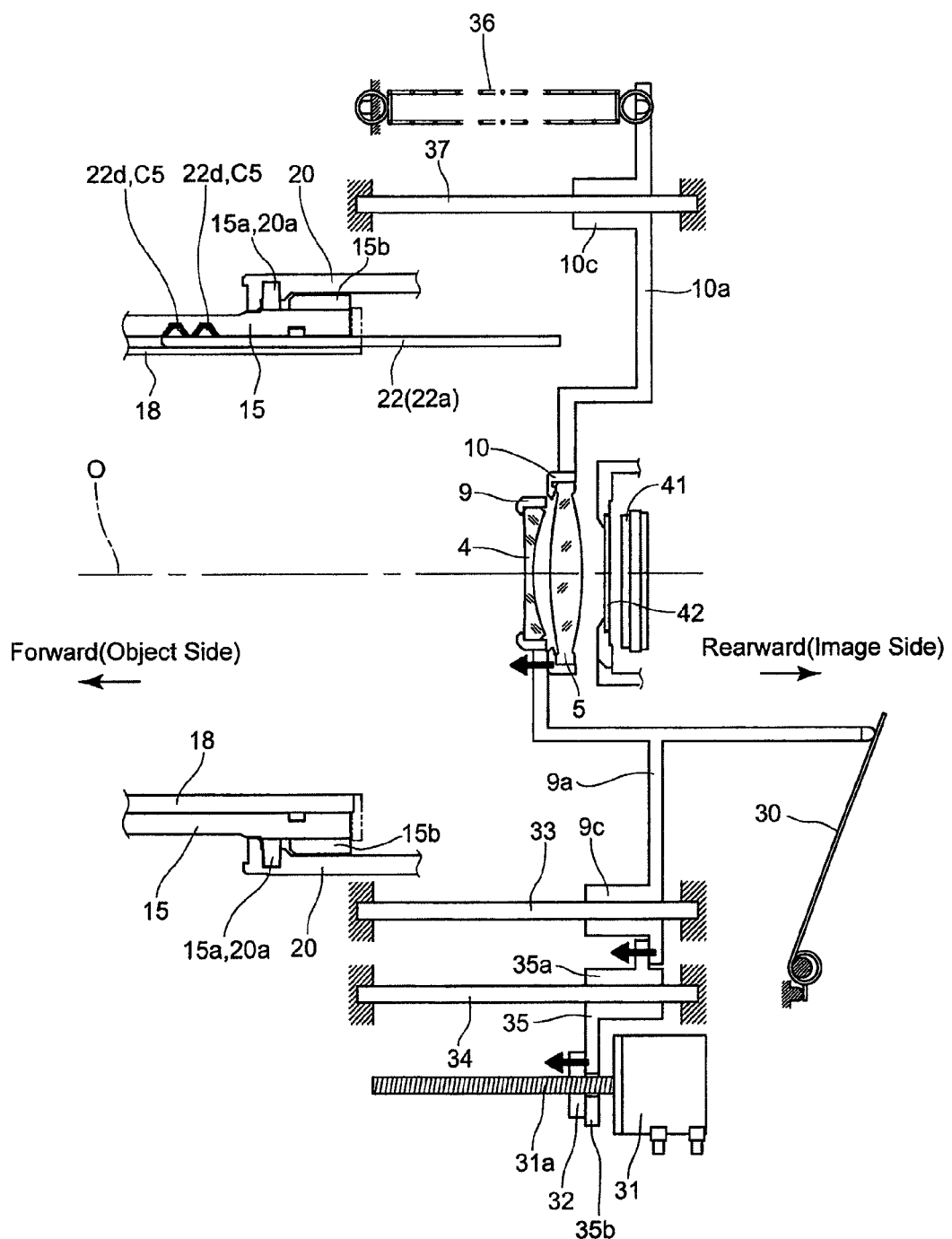
FIG. 10 is a cross-sectional view showing the positional relationship between the drive mechanisms of the fourth and fifth lens groups when the fifth-lens-group drive bar is located at a position that corresponds to the wide-angle extremity, and the fourth and fifth lens groups are located at positions corresponding to the accommodation state.

FIG. 10 shows a malfunctioned operational state in which the AF nut 32 is stopped (stationary) at a position that corresponds to the accommodated state in FIG. 11, whereas the first advancing/retracting ring 15 is held at a position corresponding to the wide-angle extremity shown in FIG. 9 by the zoom motor 39. The fourth-lens-group frame 9 (fourth lens group 4) remains at a position near the rear end of the driving range M (at a rearward position with respect to the optical axis direction from the movement path Q4, at the wide-angle extremity) with the AF nut 32, so that the fifth-lens-group frame 10 has abutted against (has collided with) the fourth-lens-group frame 9 from the rearward direction. In this condition, although the fifth-lens-group frame 10 is restricted from moving forward by abutting against the fourth-lens-group frame 9, which is restricted from moving forwardly in the optical axis direction, the fifth-lens-group frame 10 and the fifth-lens-group drive bar 22 which controls the position of the fifth-lens-group frame 10 are separate members from the first arm 10a that abuts against the upright part 22b by the biasing force of the fifth-lens-group biasing spring 36; hence, the fifth-lens-group drive bar 22 is not prevented from moving forwardly in the optical axis direction in accordance with the fifth-lens-group cam grooves C5 of the first advancing/retracting ring 15. Accordingly, if the zoom motor 39 is driven in a direction to advance the zoom lens barrel ZL with the forward movement of the fourth-lens-group frame 9 and fifth-lens-group frame 10 restricted, the excess load is absorbed by the fifth-lens-group drive bar 22 moving away from the (movement-restricted) fifth-lens-group frame 10 as shown in FIG. 10. In other words, neither the movement mechanism (first drive mechanism) of the fifth-lens-group frame 10 nor the movement mechanism (second drive mechanism) of the fourth-lens-group frame 9 receives an excessive load. As can be understood upon comparing FIGS. 9 and 10, the fifth-lens-group biasing spring 36 is extended and tension is exerted thereon by the load-absorption action occurring by the fifth-lens-group frame 10 and the fifth-lens-group drive bar 22 moving away from each other. If the AF nut 32 is driven forwardly in the optical axis direction from the state shown in FIG. 10 to a position corresponding to the wide-angle extremity, the state shown in FIG. 9 occurs, in which the fifth-lens-group frame 10 and the fifth-lens-group drive bar 22 abut against each other by the biasing force of the fifth-lens-group biasing spring 36, thereby resolving the above-described malfunctioned operational state.

Furthermore, at the wide-angle extremity shown in FIG. 9, in the case where the AF motor 31 is driven without driving the zoom motor 39 to move the AF nut 32 rearwardly in the optical axis direction, the fourth-lens-group frame 9, which is pressed by the AF nut 32, abuts against the fifth-lens-group frame 10, so that the fourth-lens-group frame 9 and the fifth-lens-group frame 10 both move rearwardly in the optical axis direction against the biasing force of the fifth-lens-group biasing spring 36. At this stage, since the movement force of the fourth-lens-group frame 9 and of the fifth-lens-group frame 10 do not get transferred to the fifth-lens-group drive bar 22, the fifth-lens-group frame 10 moves away from the fifth-lens-group drive bar 22 while the position, with respect to the optical axis direction, of the fifth-lens-group drive bar 22 does not change, so that the zoom lens barrel ZL transfers to the state shown in FIG. 10, thereby absorbing the excess load on the fifth-lens-group frame 10. Upon the zoom motor 39 driving the zoom lens barrel ZL in a direction toward the accommodated position (accommodated state) from the state shown in FIG. 10, the fifth-lens-group drive bar 22 moves rearwardly in the optical axis direction in accordance with the first advancing/retracting ring 15 and the fifth-lens-group cam grooves C5, and arrives at the accommodated state shown in FIG. 11, in which the fifth-lens-group drive bar 22 abuts against the fifth-lens-group frame 10, thereby resolving the above-described malfunctioned operational state.

In other words, in a state where the fourth-lens-group frame 9 and the fifth-lens-group frame 10 abut against each other in the interference region P, the load is absorbed by the fifth-lens-group frame 10 and the fifth-lens-group drive bar 22 moving away from each other in either case where the driving force that moves the fifth-lens-group frame 10 forwardly in the optical axis direction relative to the fourth-lens-group frame 9 acts on the drive mechanism of the fifth-lens-group frame 10, or where the driving force that moves the fourth-lens-group frame 9 rearwardly in the optical axis direction relative to the fifth-lens-group frame 10 acts on the drive mechanism of the fourth-lens-group frame 9.

Although FIGS. 9 through 12 show a representative example of the relationship between the fourth-lens-group frame 9 and the fifth-lens-group frame 10 at the wide-angle extremity and the accommodated state, since it is possible for the fourth-lens-group frame 9 and the fifth-lens-group frame 10 to abut against each other in an arrangement other than when a malfunction operation occurs at the wide-angle extremity or the accommodated state (as described above), a configuration in which the load is absorbed at the drive mechanism of the fifth-lens-group frame 10 is effective. For example, as shown in FIG. 8, in the movement path Q4 of the fourth lens group 4 in the zooming range, the fourth lens group 4 is positioned at the rearward most position, with respect to the optical axis direction, at a focal distance S1, which is near the telephoto extremity. If a focusing operation is performed toward an object at a close distance at the focal distance S1, near the telephoto extremity (refer to the arrow in FIG. 9 that indicates the rearward movement of the fourth lens group 4 in the optical axis direction), the fourth lens group 4 moves rearwardly and enters the interference region P at a focal distance that is closer to the wide-angle extremity than that at the focal distance S1. In other words, in this state, it is possible for the fourth-lens-group frame 9 and the fifth-lens-group frame 10 to interfere with each other. In this state, if the zoom motor 39 is driven from the focal distance S1 toward the wide-angle extremity without the AF motor 31 being driven, the fifth lens group 5 gradually moves forwardly in the optical axis direction in accordance with the movement path Q5 and the fifth-lens-group frame 10 abuts against the fourth-lens-group frame 9 at a midway position while moving toward the wide-angle extremity. Since the fifth-lens-group frame 10 cannot be moved further forward than the position at which the fifth-lens-group frame 10 abuts the fourth-lens-group frame 9, as the zoom motor 39 continues to be driven toward the wide-angle extremity, the fifth-lens-group drive bar 22 moves forward on its own while moving away from the fifth-lens-group frame 10. Since the travelling direction of the movement path Q5 of the fifth lens group 5 reverses before reaching the wide-angle extremity, and thereafter inclines rearwardly in the optical axis direction toward the accommodated state (see FIG. 8), if the driving of the zoom motor 39 toward the accommodated state is continued, the movement direction of the fifth-lens-group drive bar 22 changes to a rearward optical axis direction, so that the fifth-lens-group drive bar 22 abuts against the fifth-lens-group frame 10 again.

As discussed above, in the zoom lens barrel ZL according to the illustrated embodiment, the first-lens-group frame 6, the second-lens-group frame 7 and the third-lens-group frame (third-lens-group unit 28) are provided in front of the fourth-lens-group frame 9 (which is driven by the feed screw 31a of the AF motor 31 and the AF nut 32), and the fifth-lens-group frame 10 is provided behind the fourth-lens-group frame 9, while the movement of the first-lens-group frame 6, the second-lens-group frame 7, the third-lens-group frame 8 (third-lens-group unit 28) and the fifth-lens-group frame 10 are controlled by the cam grooves in cam rings (the first advancing/retracting ring 15 and the inner cam ring 19) that are rotatably driven by the zoom motor 39. In regard to the fourth-lens-group frame 9, in particular, by providing the fifth-lens-group frame 10 on the reverse side (image side) thereof to the direction of the biasing force of the fourth-lens-group biasing spring 30, a lens system arrangement can be achieved which has a degree of freedom without having the restrictions on the drive mechanism(s) like those of the related art. Although the driving (movement) ranges of the fourth-lens-group frame 9 and the fifth-lens-group frame 10 are included in the interference region P, in which a collision therebetween is possible, so that the fourth-lens-group frame 9 and the fifth-lens-group frame 10 can be driven (moved) in accordance with optically desirable movement paths without sacrificing the compactness of the zoom lens barrel ZL, even in a case where the fourth-lens-group frame 9 and the fifth-lens-group frame 10 were to abut against each other in the interference region P, as described above, such an excess load (against the fourth-lens-group frame 9 and the fifth-lens-group frame 10) can be absorbed by moving the fifth-lens-group drive bar 22 that is guided by the fifth-lens-group cam grooves C5 relative to the fifth-lens-group frame 10 in the optical axis direction, so that the drive mechanisms of both of the fourth-lens-group frame 9 and the fifth-lens-group frame 10 can be protected (prevented from damage or breakage).

Since the fifth-lens-group drive bar 22, which is guided by the fifth-lens-group cam grooves C5, has a shape that fits in the key guide groove 18f within the outer (cylindrical) profile of the linear guide ring 18, the load absorption within the drive mechanism of the fifth-lens-group frame 10 can be achieved simply and with a space-efficient configuration. based on the illustrated embodiment, the present invention is not limited thereto. For example, in the illustrated embodiment, the present invention has been applied to each drive mechanism of the fourth lens group 4 and the fifth lens group 5 of the photographing optical system, which is provided with five lens groups; however, the present invention can also be applied to a lens barrel having a photographing optical system with a different number of lens groups and lens arrangement to those of the illustrated embodiment.

Furthermore, in the zoom lens barrel ZL of the illustrated embodiment, the third lens group 3, which is provided directly in front of the fourth lens group 4 in a ready-to-photograph state, is radially removed in a direction away from the optical axis O in the accommodated state; however, the present invention can also be applied to a lens barrel which is not provided with such a lens group that carries out such a radially-removal operation. Additionally, unlike the zoom lens barrel ZL of the illustrated embodiment, it is possible to also apply the present invention to a lens barrel which is not provided with an image-stabilizing mechanism, for suppressing image shake (image stabilization).

Furthermore, in the zoom lens barrel ZL of the illustrated embodiment, the movements of the third-lens-group frame 8 (third-lens-group support ring 12), which is provided in front of the fourth-lens-group frame 9, and the fifth-lens-group frame 10, which is provided behind the fourth-lens-group frame 9, are controlled by different cam rings (the first advancing/retracting ring 15 and the inner cam ring 19); however, the present invention can also be applied to a lens barrel in which the movements of two (or three or more) lens frames respectively positioned in front and behind a nut-driven lens frame (corresponding to the fourth-lens-group frame 9) are controlled by cam grooves formed in a common cam ring.

Furthermore, although the zoom lens barrel ZL of the illustrated embodiment is provided with the first advancing/retracting ring 15 and the inner cam ring 19, which serve as cam rings that rotate while moving in the optical axis direction, it is possible to also apply the present invention to a type of lens barrel in which the cam ring(s) does not move in the optical axis direction while rotating at a constant stationary position.

Furthermore, although the zoom lens barrel ZL of the illustrated embodiment is provided with an intermediary member 35 between the fourth-lens-group frame 9 and the AF nut 32, it is possible for the drive mechanism to have a configuration in which the fourth-lens-group frame 9 and the AF nut 32 directly abut against each other with the intermediary member 35 omitted.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
a first drive mechanism including a stationary barrel, a cam ring configured to be supported in said stationary barrel, and a cam-driven lens frame configured to hold a lens group that constitutes part of a photographing optical system, wherein:
said first drive mechanism is configured to rotate said cam ring to change a position, with respect to an optical axis direction, of said cam-driven lens frame, in accordance with a contour of a cam groove formed on an inner peripheral surface of said cam ring, and, an inner ring, which is restricted from rotating relative to said stationary barrel, is supported inside said cam ring; and
a second drive mechanism including a nut, a feed screw extending in the optical axis direction and screw-engaged with said nut to allow said nut to relatively move therealong, and a nut-driven lens frame configured to hold another lens group that is different to said lens group, wherein said second drive mechanism is configured to bias said nut-driven lens frame in a biasing-direction to abut against said nut in the optical axis direction, and said second drive mechanism is configured to change a position of said nut-driven lens frame with respect to the optical axis direction by rotating said feed screw to in turn move said nut in the optical axis direction,
wherein said nut-driven lens frame and said cam-driven lens frame are arranged so that said cam-driven lens frame is positioned adjacent to said nut-driven lens frame, and wherein driving ranges of said nut-driven lens frame and said cam-driven lens frame partially overlap each other in the optical axis direction, and
wherein said first drive mechanism further includes:
a cam-driven member, which is formed as a separate member from said cam-driven lens frame, linearly guided in the optical axis direction and is provided with a cam follower which engages with said cam groove of said cam ring, wherein said cam-driven member is slidably fitted in a bottomed linear guide groove formed on an outer peripheral surface of said inner ring so that said cam follower of said cam-driven member projects radially outward relative to the outer peripheral surface of said inner ring; and
a biasing member which biases, in the optical axis direction, said cam-driven lens frame in a direction toward and to closely approach said nut-driven lens frame to thereby cause said cam-driven lens frame to abut against said cam-drive member, so that said cam-driven lens frame is moved in the optical axis direction with said cam-driven member.

2. The lens barrel according to claim 1, wherein said cam-driven member comprises:
a long and thin plate-shaped guide key part which is elongated in the optical axis direction and slidably fitted into said linear guide groove of said inner ring; and
an upright part formed at an end, with respect to the optical axis direction, of said guide key part and extending in a direction that is orthogonal to the optical axis,
wherein said cam-driven lens frame abuts against said upright part by a biasing force of said biasing member.

3. The lens barrel according to claim 2, further comprising an auxiliary guide rod which is located on an outer side of said cam ring and is fixed to said stationary barrel, the central longitudinal axis of said auxiliary guide rod extending in the optical axis direction, and
wherein said upright part of said cam-driven member is provided with a guided part, which is slidably supported in the optical axis direction by said auxiliary guide rod.

4. The lens barrel according to claim 2, wherein said cam-driven lens frame comprises:
at least one arm which extends in an outer radial direction, centered from the optical axis, from a lens holding portion, which holds said lens group; and
a guided portion formed on an outer end of said arm, said guided portion being slidably supported in the optical axis direction on a lens-frame guide rod, the central longitudinal axis thereof extending in the optical axis direction, which is fixed to said stationary barrel,
wherein said arm abuts against said upright part of said cam-driven member by a biasing force of said biasing member.

5. The lens barrel according to claim 4, wherein said biasing member comprises a tension spring, one and the other end of which is engaged onto said stationary barrel and said cam-driven lens frame, respectively, wherein said tension spring extends and contracts in the optical axis direction.

6. The lens barrel according to claim 1, wherein said lens group that is held by said cam-driven lens frame is provided on the image side, with respect to the optical axis direction, of a lens group which is held by said nut-driven lens frame.

7. The lens barrel according to claim 6, wherein the lens group that is held by said cam-driven lens frame is provided closest to the image side of said photographing optical system, and
wherein the lens group that is held by said nut-driven lens frame is provided adjacent to, and on the object side of, the lens group that is provided closest to the image side.

8. The lens barrel according to claim 1, wherein said second drive mechanism rotates said feed screw by a stepping motor which is mounted onto said stationary barrel.

9. The lens barrel according to claim 1, wherein said photographing optical system comprises a zoom optical system, said cam-driven lens frame and said nut-driven lens frame being respectively moved in the optical axis direction during a zooming operation, and wherein said nut-driven lens frame is solely moved in the optical axis direction during a focusing operation on an object.

10. The lens barrel according to claim 1, further comprising a second cam-driven lens frame which holds another lens group that constitutes part of said photographing optical system, and is controlled to move in the optical axis direction by another cam groove that is different from the cam groove that is used to drive said cam-driven lens frame,
wherein, in a ready-to-photograph state, said cam-driven lens frame and said second cam-driven lens frame are respectively positioned at either side of said nut-driven lens frame with respect to the optical axis direction.

11. The lens barrel according to claim 10, further comprising a second cam ring which is a separate member from said cam ring and rotates with said cam ring, wherein said another cam groove which drives said second cam-driven lens frame is formed in said second cam ring.

* * * * *